(12) United States Patent
Sikri et al.

(10) Patent No.: US 8,675,796 B2
(45) Date of Patent: *Mar. 18, 2014

(54) INTERFERENCE CANCELLATION UNDER NON-STATIONARY CONDITIONS

(75) Inventors: Divaydeep Sikri, Woking (GB); Farrokh Abrishamkar, San Diego, CA (US); Ming Yan, San Diego, CA (US); Nico De Laurentiis, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/215,984

(22) Filed: Aug. 23, 2011

(65) Prior Publication Data

US 2011/0305303 A1    Dec. 15, 2011

Related U.S. Application Data

(63) Continuation of application No. 12/464,311, filed on May 12, 2009.

(60) Provisional application No. 61/052,973, filed on May 13, 2008.

(51) Int. Cl.
*H04B 1/10* (2006.01)
*H04L 27/00* (2006.01)

(52) U.S. Cl.
USPC .......................................................... 375/350

(58) Field of Classification Search
USPC .................. 375/316, 346, 348, 350
See application file for complete search history.

(56) References Cited

U.S. PATENT DOCUMENTS 5,267,249 A    11/1993   Dong
5,887,035 A    3/1999    Molnar
(Continued)

FOREIGN PATENT DOCUMENTS

CN    1207835 A    2/1999
CN    1736101 A    2/2006
(Continued)

OTHER PUBLICATIONS

Meyr, H. et al., "Chapter 5: Synthesis of Synchronization Algorithms" and "Chapter 8: Frequency Estimation," Jan. 1, 1998, Digital Communication Receivers:Synchronization,Channel Estimation, and Signal Processing; John Wiley and Sons, Inc.: New York, pp. 271-323,445, XP002547568.

(Continued)

*Primary Examiner* — Kevin M Burd
(74) *Attorney, Agent, or Firm* — Eric Ho

(57) ABSTRACT

A method for timing and frequency synchronization in a wireless system is provided. The method comprises the steps of receiving a burst of symbols, selecting a subset of the burst of symbols, iteratively adjusting the subset of the burst of symbols by a plurality of timing offsets and calculating, for each timing offset, a first performance metric corresponding to the adjusted subset. The method further comprises the steps of determining one of the plurality of timing offsets to be a preferred timing offset based upon the first performance metric thereof, iteratively rotating the subset of the burst of symbols by a plurality of frequency offsets and calculating, for each frequency offset, a second performance metric corresponding to the rotated subset, and determining one of the plurality of frequency offsets to be a preferred frequency offset based upon the second performance metric thereof.

73 Claims, 11 Drawing Sheets

(56) References Cited

U.S. PATENT DOCUMENTS

| | | |
|---|---|---|
| 6,259,730 B1 | 7/2001 | Solondz |
| 6,480,558 B1 | 11/2002 | Ottosson et al. |
| 6,587,522 B1 | 7/2003 | Wheeler et al. |
| 6,590,881 B1 | 7/2003 | Wallace et al. |
| 6,615,030 B1 | 9/2003 | Saito et al. |
| 6,628,707 B2 | 9/2003 | Rafie et al. |
| 6,765,894 B1 | 7/2004 | Hayashi |
| 6,771,689 B2 | 8/2004 | Solondz |
| 6,834,197 B2 | 12/2004 | Nakahara et al. |
| 6,907,092 B1 | 6/2005 | Yakhnich et al. |
| 6,931,030 B1 | 8/2005 | Dogan |
| 6,959,010 B1 | 10/2005 | Bahrenburg et al. |
| 6,985,516 B1 | 1/2006 | Easton et al. |
| 7,013,147 B1 | 3/2006 | Kuwahara et al. |
| 7,107,031 B2 | 9/2006 | Kristensson et al. |
| 7,116,735 B2 | 10/2006 | Yamada et al. |
| 7,187,736 B2 | 3/2007 | Buckley et al. |
| 7,200,172 B2 | 4/2007 | Pukkila et al. |
| 7,295,636 B2 | 11/2007 | Onggosanusi et al. |
| 7,298,806 B1 | 11/2007 | Varma et al. |
| 7,308,056 B2 | 12/2007 | Pukkila et al. |
| 7,313,189 B2 | 12/2007 | Yoshida et al. |
| 7,620,662 B2 | 11/2009 | Kassai et al. |
| 7,693,210 B2 | 4/2010 | Margetts et al. |
| 7,706,430 B2 | 4/2010 | Guo et al. |
| 7,764,726 B2 | 7/2010 | Simic et al. |
| 7,801,248 B2 | 9/2010 | Challa et al. |
| 7,933,256 B2 | 4/2011 | Abrishamkar et al. |
| 8,396,440 B2 | 3/2013 | Canpolat et al. |
| 8,422,955 B2 | 4/2013 | Smee et al. |
| 2002/0132625 A1 | 9/2002 | Ogino et al. |
| 2002/0181557 A1 | 12/2002 | Fujii |
| 2003/0112370 A1 | 6/2003 | Long et al. |
| 2003/0119451 A1 | 6/2003 | Jang et al. |
| 2003/0147476 A1 | 8/2003 | Ma et al. |
| 2004/0001563 A1 | 1/2004 | Scarpa |
| 2004/0014424 A1 | 1/2004 | Kristensson et al. |
| 2004/0017311 A1 | 1/2004 | Thomas et al. |
| 2004/0043746 A1 | 3/2004 | Hiramatsu |
| 2004/0062302 A1 | 4/2004 | Fujii et al. |
| 2004/0081248 A1 | 4/2004 | Parolari |
| 2004/0116122 A1 | 6/2004 | Zeira et al. |
| 2004/0203913 A1 | 10/2004 | Ogino et al. |
| 2004/0223538 A1 | 11/2004 | Zeira |
| 2005/0084045 A1 | 4/2005 | Stewart et al. |
| 2005/0111408 A1 | 5/2005 | Skillermark et al. |
| 2005/0147024 A1 | 7/2005 | Jung et al. |
| 2005/0153695 A1 | 7/2005 | Cho |
| 2005/0232174 A1 | 10/2005 | Onggosanusi et al. |
| 2005/0265465 A1 | 12/2005 | Hosur et al. |
| 2005/0277429 A1 | 12/2005 | Laroia et al. |
| 2006/0126765 A1 | 6/2006 | Shin et al. |
| 2006/0146953 A1* | 7/2006 | Raghothaman et al. ...... 375/267 |
| 2006/0146969 A1 | 7/2006 | Zhang et al. |
| 2006/0203943 A1 | 9/2006 | Scheim et al. |
| 2006/0209982 A1 | 9/2006 | De Gaudenzi et al. |
| 2006/0227853 A1 | 10/2006 | Liang et al. |
| 2006/0234715 A1 | 10/2006 | Cho et al. |
| 2007/0058709 A1 | 3/2007 | Chen et al. |
| 2007/0063897 A1 | 3/2007 | Matsuda |
| 2007/0071145 A1 | 3/2007 | Perets |
| 2007/0121764 A1 | 5/2007 | Chen et al. |
| 2007/0127608 A1 | 6/2007 | Scheim et al. |
| 2007/0183483 A1 | 8/2007 | Narayan et al. |
| 2007/0201548 A1 | 8/2007 | Badri-Hoeher et al. |
| 2007/0273698 A1 | 11/2007 | Du et al. |
| 2008/0019467 A1 | 1/2008 | He |
| 2008/0031368 A1 | 2/2008 | Lindoff et al. |
| 2008/0125070 A1 | 5/2008 | Grieco et al. |
| 2008/0212462 A1 | 9/2008 | Ahn et al. |
| 2008/0227456 A1 | 9/2008 | Huang et al. |
| 2008/0232439 A1 | 9/2008 | Chen |
| 2008/0298521 A1 | 12/2008 | Wu |
| 2008/0298524 A1 | 12/2008 | Koorapaty et al. |
| 2009/0052591 A1 | 2/2009 | Chen |
| 2009/0058728 A1 | 3/2009 | Mostafa et al. |
| 2009/0092178 A1 | 4/2009 | Sayana et al. |
| 2009/0207944 A1 | 8/2009 | Furman et al. |
| 2010/0027702 A1 | 2/2010 | Vijayan et al. |
| 2010/0029213 A1 | 2/2010 | Wang |
| 2010/0029262 A1 | 2/2010 | Wang et al. |
| 2010/0040035 A1 | 2/2010 | Shapiro et al. |
| 2010/0046595 A1 | 2/2010 | Sikri et al. |
| 2010/0046660 A1 | 2/2010 | Sikri et al. |
| 2010/0046682 A1 | 2/2010 | Sikri et al. |
| 2010/0054212 A1 | 3/2010 | Tang |
| 2010/0202544 A1 | 8/2010 | Osseirar et al. |
| 2010/0248666 A1* | 9/2010 | Hui et al. ...................... 455/208 |
| 2010/0278227 A1 | 11/2010 | Sikri et al. |
| 2010/0296556 A1 | 11/2010 | Rave et al. |
| 2010/0310026 A1 | 12/2010 | Sikri et al. |
| 2011/0051859 A1 | 3/2011 | Canpolat et al. |
| 2011/0051864 A1 | 3/2011 | Chalia et al. |

FOREIGN PATENT DOCUMENTS

| | | |
|---|---|---|
| CN | 1906862 A | 1/2007 |
| EP | 0396403 A1 | 11/1990 |
| EP | 0969608 A2 | 1/2000 |
| EP | 1347611 A1 | 9/2003 |
| EP | 1404047 A2 | 3/2004 |
| EP | 1411693 A2 | 4/2004 |
| EP | 1569399 A1 | 8/2005 |
| EP | 1681775 A2 | 7/2006 |
| EP | 1699194 A1 | 9/2006 |
| EP | 1699195 A1 | 9/2006 |
| EP | 1928138 A2 | 6/2008 |
| JP | 2000059290 A | 2/2000 |
| JP | 2000261397 A | 9/2000 |
| JP | 2001166026 A | 6/2001 |
| JP | 2001512916 A | 8/2001 |
| JP | 3210915 B2 | 9/2001 |
| JP | 2001257626 A | 9/2001 |
| JP | 2001267987 A | 9/2001 |
| JP | 2002507342 A | 3/2002 |
| JP | 2002508129 A | 3/2002 |
| JP | 2002539711 A | 11/2002 |
| JP | 2003051762 A | 2/2003 |
| JP | 2003152603 A | 5/2003 |
| JP | 2003338779 A | 11/2003 |
| JP | 2004048307 A | 2/2004 |
| JP | 2004112094 A | 4/2004 |
| JP | 2004511189 A | 4/2004 |
| JP | 2004159277 A | 6/2004 |
| JP | 2004166218 A | 6/2004 |
| JP | 2005065197 A | 3/2005 |
| JP | 2005510940 A | 4/2005 |
| JP | 2006503485 A | 1/2006 |
| JP | 2006191587 A | 7/2006 |
| JP | 2008278338 A | 11/2008 |
| JP | 2009545219 A | 12/2009 |
| JP | 2011524115 A | 8/2011 |
| KR | 2001085143 A | 9/2001 |
| KR | 1020097552 A | 10/2005 |
| RU | 2211531 C2 | 8/2003 |
| RU | 2233033 C2 | 7/2004 |
| RU | 2280329 C1 | 7/2006 |
| RU | 2301493 | 6/2007 |
| RU | 2319307 C2 | 3/2008 |
| TW | 365717 | 8/1999 |
| TW | 200640202 | 11/2006 |
| WO | 9857509 A2 | 12/1998 |
| WO | 9901950 A2 | 1/1999 |
| WO | 9912273 | 3/1999 |
| WO | 0055992 A1 | 9/2000 |
| WO | 0232003 A1 | 4/2002 |
| WO | 02067444 A1 | 8/2002 |
| WO | 03047124 A1 | 6/2003 |
| WO | 2004010573 A1 | 1/2004 |
| WO | 2004066666 | 8/2004 |
| WO | 2004107768 A2 | 12/2004 |
| WO | 2005053177 A1 | 6/2005 |
| WO | WO2007000620 A1 | 1/2007 |
| WO | 2007029958 A1 | 3/2007 |

(56) References Cited

FOREIGN PATENT DOCUMENTS

| WO | 2007060093 A1 | 5/2007 |
|---|---|---|
| WO | 2007060229 A1 | 5/2007 |
| WO | 2008012265 A1 | 1/2008 |
| WO | 2009108586 A2 | 9/2009 |

OTHER PUBLICATIONS

Olivier J.C., Kleynhans W.: "Single antenna interference cancellation for synchronised GSM networks using a widely linear receiver" (Mar. 3, 2005).

International Search Report and Written Opinion—PCT/US2009/043718—ISA/EPO—Mar. 24, 2010.

Natali F D: "AFC Tracking Algorithms" IEEE Transactions on Communications, IEEE Service Center, Piscataway, NJ, US, vol. COM-32, No. 8, Aug. 1, 1984, pp. 935-947, XP000758571 ISSN: 0090-6778 abstract p. 941, section C.

Taiwan Search Report—TW098115882—TIPO—May 23, 2012.

European Search Report—EP12150520—Search Authority—Munich—May 25, 2012.

3GPP Draft; 25814-150, 3rd Generation Partnership Project (3GPP), Mobile Competence Centre; 650, Route des Lucioles; F-06921 Sophia-Antipolis Cedex; France, vol. RAN WG1, No. Shanghai, China; 20060526, May 26, 2006, XP050102001 pp. 29-30 p. 76 pp. 89-90.

Huaiyu, D. et al., "Asymptotic spectral efficiency of multi cell MIMO systems with frequency-flat fading," IEEE Transactions on Signal Processing, IEEE Service Center, New York, NY, US, vol. 51, No. 11, Nov. 1, 2003, pp. 2976-2988, XP011102811.

Pais, A.V., et al., "Indoor DS-CDMA system deployment and performance with successive interference cancellation," Electronics Letters: GB, vol. 40, No. 19, Sep. 16, 2004, pp. 1200-1201, XP006022654.

Ritt: "Performance of IDMA-based inter-cell interference cancellation," 3GPP Draft TSG-RAN WG1 #44-bis Meeting, R1-060895, 3rd Generation Partnership Project (3GPP), Athens, Greece; Mar. 27, 2006, XP050101801, pp. 1-5.

Sawahashi M., et al., "Multipath Interference Canceller for Orthogonal Multiplexed Channel and its Performance in W-CDMA Forward Link," Technical Report of the Institute of Electronics, Information and Communication Engineers, Jan. 12, 2001, vol. 100, No. 558, pp. 27-33, RCS2000-195.

Chunguang, W., et al., "Enhanced OTDOA Technology in 3G Location Service", Shanghai Research Institute of China Telecom, Shanghai 200122, China, Aug. 31, 2005.

Xiaofa, L, "The study of Interference Cancellation based on Multi-User Detection", Chinese Scientific Papers Online, pp. 7, Mar. 27, 2008.

* cited by examiner

US 8,675,796 B2

INTERFERENCE CANCELLATION UNDER NON-STATIONARY CONDITIONS

CLAIM OF PRIORITY UNDER 35 U.S.C. §119 AND §120

The present Application for Patent is a Continuation of patent application Ser. No 12/464,311 entitled "INTERFERENCE CANCELLATION UNDER NON-STATIONARY CONDITIONS,", filed May 12, 2009 which claims the benefit of Patent Application No. 61/052,973 entitled "TWO DIMENSIONAL SEARCH FOR GERAN OPTIMAL TIMING AND CARRIER RECOVERY,", filed May 13, 2008, assigned to the assignee hereof, and expressly incorporated by reference herein,

REFERENCE TO CO-PENDING APPLICATIONS FOR PATENT

The present Application for Patent is also related to co-pending U.S. patent application Ser. No. 12/038,724, entitled "COHERENT SINGLE ANTENNA INTERFERENCE CANCELLATION FOR GSM/GPRS/EDGE,", filed Feb. 27, 2008, assigned to the assignee hereof, and expressly incorporated by reference herein.

BACKGROUND

1. Field

The present invention generally relates to wireless communication and, in particular, relates to interference cancellation under non-stationary conditions.

2. Background

In many communication systems utilizing GSM, GPRS, EDGE or the like, a receiver's ability to properly decode a received signal depends upon the receiver's ability to accurately estimate symbol timing and frequency. As wireless communications become ever more prevalent, however, increasing amounts of interference can negatively impact a receiver's ability to do so.

SUMMARY

According to one aspect of the subject technology, optimal timing and frequency (by which to rotate the received samples) are jointly obtained in a wireless communication system by parametrizing the subspace into possible timing and frequency hypotheses and searching through them. Joint Max Likelihood of frequency and timing may be performed sequentially or in parallel.

According to certain aspects of the subject technology, an interference suppression filter is tuned to various parameters, and then optimal pairs (of time and frequency) are picked by minimizing the prediction error using a known sequence (midamble or quasi-midamble, e.g., data aided). The algorithm boosts the received signal quality under strong interference whereas non-coherent estimation would degrade significantly.

According to one aspect of the subject technology, a method for timing and frequency synchronization in a wireless system comprises the steps of receiving a burst of symbols, selecting a subset of the burst of symbols, iteratively adjusting the subset of the burst of symbols by a plurality of timing offsets and calculating, for each timing offset, a first performance metric corresponding to the adjusted subset. The method further comprises the steps of determining one of the plurality of timing offsets to be a preferred timing offset based upon the first performance metric thereof, iteratively rotating the subset of the burst of symbols by a plurality of frequency offsets and calculating, for each frequency offset, a second performance metric corresponding to the rotated subset, and determining one of the plurality of frequency offsets to be a preferred frequency offset based upon the second performance metric thereof According to another aspect of the subject technology, a method for timing and frequency synchronization in a wireless system comprises the steps of receiving a burst of symbols, selecting a subset of the burst of symbols, iteratively adjusting the subset of the burst of symbols by a plurality of timing offsets and a plurality of frequency offsets, calculating, for each combination of timing and frequency offsets, a performance metric corresponding to the adjusted subset, and determining one of the combination of timing and frequency offsets to be a preferred combination based upon the performance metric thereof.

According to another aspect of the subject technology, a wireless apparatus comprises a receiver configured to receive a burst of symbols, and a processor. The processor is configured to select a subset of the burst of symbols, iteratively adjust the subset of the burst of symbols by a plurality of timing offsets and calculate, for each timing offset, a first performance metric corresponding to the adjusted subset. The processor is further configured to determine one of the plurality of timing offsets to be a preferred timing offset based upon the first performance metric thereof, iteratively rotate the subset of the burst of symbols by a plurality of frequency offsets and calculate, for each frequency offset, a second performance metric corresponding to the rotated subset, and determine one of the plurality of frequency offsets to be a preferred frequency offset based upon the second performance metric thereof.

According to another aspect of the subject technology, a wireless apparatus comprises a receiver configured to receive a burst of symbols, and a processor. The processor is configured to receive a burst of symbols, select a subset of the burst of symbols, iteratively adjust the subset of the burst of symbols by a plurality of timing offsets and a plurality of frequency offsets, calculate, for each combination of timing and frequency offsets, a performance metric corresponding to the adjusted subset, and determine one of the combination of timing and frequency offsets to be a preferred combination based upon the performance metric thereof.

According to another aspect of the subject technology, a wireless apparatus comprises means for receiving a burst of symbols, means for selecting a subset of the burst of symbols, means for iteratively adjusting the subset of the burst of symbols by a plurality of timing offsets and for calculating, for each timing offset, a first performance metric corresponding to the adjusted subset, means for determining one of the plurality of timing offsets to be a preferred timing offset based upon the first performance metric thereof, means for iteratively rotating the subset of the burst of symbols by a plurality of frequency offsets and calculating, for each frequency offset, a second performance metric corresponding to the rotated subset, and means for determining one of the plurality of frequency offsets to be a preferred frequency offset based upon the second performance metric thereof.

According to another aspect of the subject technology, a wireless apparatus comprises means for receiving a burst of symbols, means for selecting a subset of the burst of symbols, means for iteratively adjusting the subset of the burst of symbols by a plurality of timing offsets and a plurality of frequency offsets, means for calculating, for each combination of timing and frequency offsets, a performance metric corresponding to the adjusted subset, and means for determining one of the combination of timing and frequency offsets to be a preferred combination based upon the performance metric thereof.

According to another aspect of the subject technology, a computer-program product for use in a wireless communication system comprises a computer readable medium having a set of instructions stored thereon, the set of instructions being executable by one or more processors and the set of instructions comprising instructions for receiving a burst of symbols, instructions for selecting a subset of the burst of symbols, instructions for iteratively adjusting the subset of the burst of symbols by a plurality of timing offsets and for calculating, for each timing offset, a first performance metric corresponding to the adjusted subset, instructions for determining one of the plurality of timing offsets to be a preferred timing offset based upon the first performance metric thereof, instructions for iteratively rotating the subset of the burst of symbols by a plurality of frequency offsets and for calculating, for each frequency offset, a second performance metric corresponding to the rotated subset, and instructions for determining one of the plurality of frequency offsets to be a preferred frequency offset based upon the second performance metric thereof.

According to another aspect of the subject technology, a computer-program product for use in a wireless communication system comprises a computer readable medium having a set of instructions stored thereon, the set of instructions being executable by one or more processors and the set of instructions comprising instructions for receiving a burst of symbols, instructions for selecting a subset of the burst of symbols, instructions for iteratively adjusting the subset of the burst of symbols by a plurality of timing offsets and a plurality of frequency offsets, instructions for calculating, for each combination of timing and frequency offsets, a performance metric corresponding to the adjusted subset, and instructions for determining one of the combination of timing and frequency offsets to be a preferred combination based upon the performance metric thereof.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
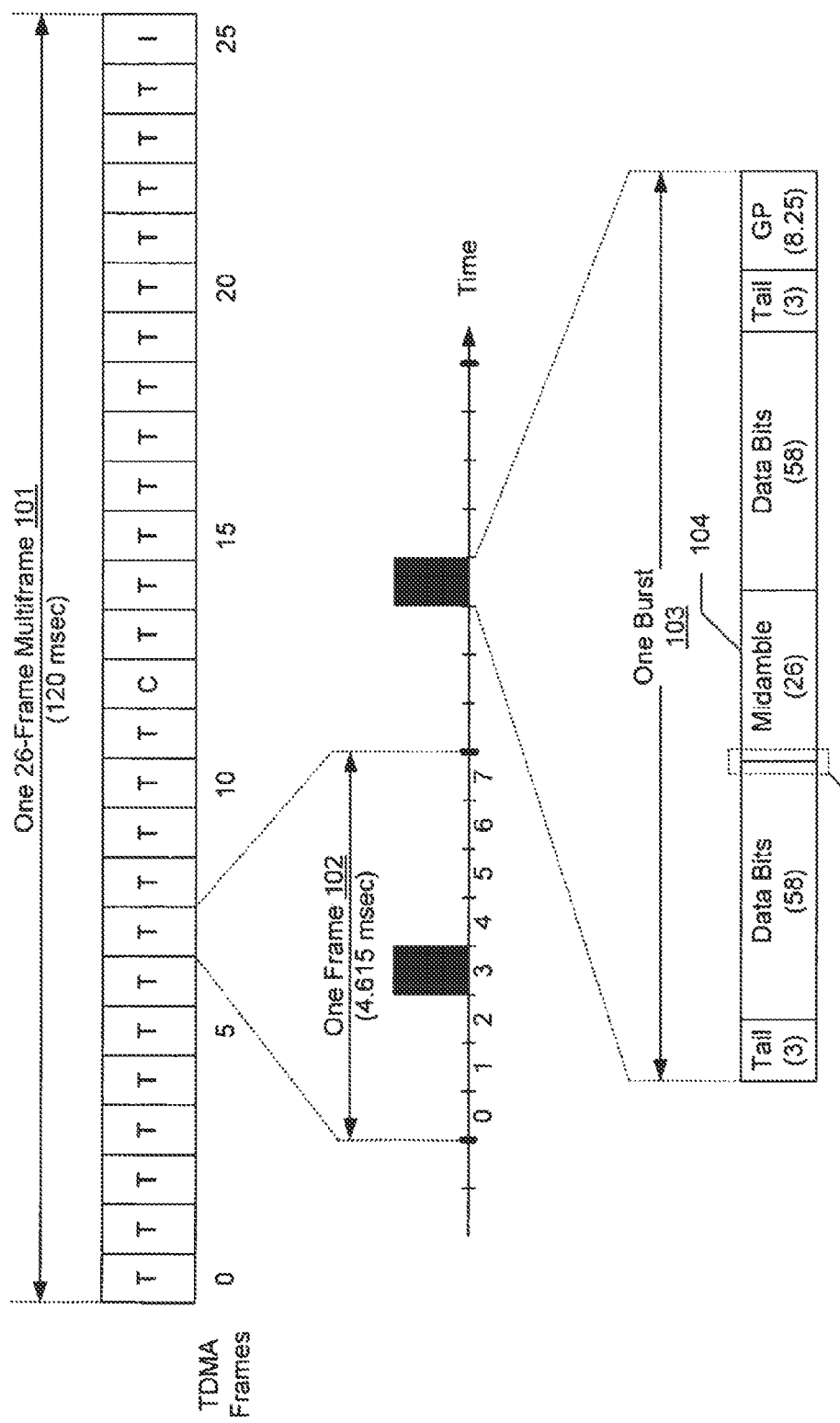
FIG. 1 illustrates exemplary frame and burst formats in GSM in accordance with one aspect of the subject technology.

FIG. 1 shows exemplary frame and burst formats in GSM. The timeline for downlink transmission is divided into multiframes. For traffic channels used to send user-specific data, each multiframe, such as exemplary multiframe 101, includes 26 TDMA frames, which are labeled as TDMA frames 0 through 25. The traffic channels are sent in TDMA frames 0 through 11 and TDMA frames 13 through 24 of each multiframe, as identified by the letter "T" in FIG. 1. A control channel, identified by the letter "C," is sent in TDMA frame 12. No data is sent in the idle TDMA frame 25 (identified by the letter "I"), which is used by the wireless devices to make measurements for neighbor base stations.

Each TDMA frame, such as exemplary TDMA frame 102, is further partitioned into eight time slots, which are labeled as time slots 0 through 7. Each active wireless device/user is assigned one time slot index for the duration of a call. User-specific data for each wireless device is sent in the time slot assigned to that wireless device and in TDMA frames used for the traffic channels.

The transmission in each time slot is called a "burst" in GSM. Each burst, such as exemplary burst 103, includes two tail fields, two data fields, a training sequence (or midamble) field, and a guard period (GP). The number of bits in each field is shown inside the parentheses. GSM defines eight different training sequences that may be sent in the training sequence field. Each training sequence, such as midamble 104, contains 26 bits and is defined such that the first five bits are repeated and the second five bits are also repeated. Each training sequence is also defined such that the correlation of that sequence with a 16-bit truncated version of that sequence is equal to (a) sixteen for a time shift of zero, (b) zero for time shifts of ±1, ±2, ±3, ±4, and ±5, and (3) a zero or non-zero value for all other time shifts.

One approach to locating a midamble in a burst of symbols serially compares hypotheses regarding the midamble position to determine which hypothesis provides the highest correlation energy between the known midamble sequence and the hypothesized position in the burst of symbols. This method is very sensitive to interference from multi-paths of the same midamble sequence, which can cause the correlation energy of inaccurate hypotheses to be affected by time-delayed copies thereof.

Non-Coherent Frequency and Timing estimation suffers from performance degradation under presence of strong interference. According to one aspect of the subject technology, by semi-coherently estimating the optimal timing and frequency, performance in the presence of interference can be greatly improved.

According to one aspect of the subject technology, optimal timing and frequency (by which to rotate the received samples) are jointly obtained by parametrizing the subspace into possible hypotheses and searching through them. Joint Max Likelihood of frequency and timing may be further simplified to a sequential search to provide optimal performance.

According to one aspect of the subject technology, an interference suppression filter is tuned to various parameters, and then optimal pairs (of time and frequency) are picked by minimizing the prediction error using a known sequence (midamble or quasi-midamble, e.g., data aided). The algorithm boosts the received signal quality under strong interference whereas non-coherent estimation would degrade significantly.

For example, given a set of spatial and temporal samples at time k:

$$x_k = \begin{bmatrix} x_k(1) \\ x_k(2) \\ \vdots \\ x_k(M) \end{bmatrix}, s_k = \begin{bmatrix} s_k \\ s_{k-1} \\ \vdots \\ s_{k-\upsilon} \end{bmatrix}$$

where $s_k$ is the midamble/quasi-midamble signal at time k, $s_k$ is a $(\upsilon+1)\times 1$ midamble/quasi-midamble vector, and $x_k$ is a $M\times 1$ received midamble/quasi-midamble vector, a set of spatial temporal samples can be defined as $$X_k = \begin{bmatrix} x_k \\ x_{k-1} \\ \vdots \\ x_{k-L} \end{bmatrix},$$

where $X_k$ is a $M\times(L+1)\times 1$ vector of spatial temporal samples with a spatial length of M and a temporal length of L+1. Accordingly, a spatial/temporal structured matrix can be constructed, such that $$[X]=[X_k X_{k+1} \ldots X_{k+p-\upsilon}],$$

where [X] is a $M(L+1)\times p-\upsilon$ matrix, and p is the length of the midamble or quasi-midamble (data aided).

Accordingly, given [X] and $\tilde{s}_k=[s_k, s_{k+1}, \ldots s_{k+p-\upsilon}]$, $(\upsilon+1)\times p-\upsilon$, a suppression filter $W_{SAIC}$ can be computed according to one aspect of the subject disclosure by estimating a reference sequence of symbols at the channel input:

$$W_{SAIC}=\arg\min \|W[X]-\tilde{Z}\|^2$$

where $W=(\upsilon+1)\times M(L+1)$ and $\tilde{Z}=\tilde{s}_k(\upsilon+1)\times(p-\upsilon)$.

The foregoing equation can be rewritten as $$W_{SAIC}=\tilde{Z}[X]^\dagger, (\upsilon+1)\times M(L+1)$$

or, more particularly, as $$W_{SAIC}=\tilde{s}_k[X]^T\{[X][X]^T\}^{-1}.$$

Figure 2:
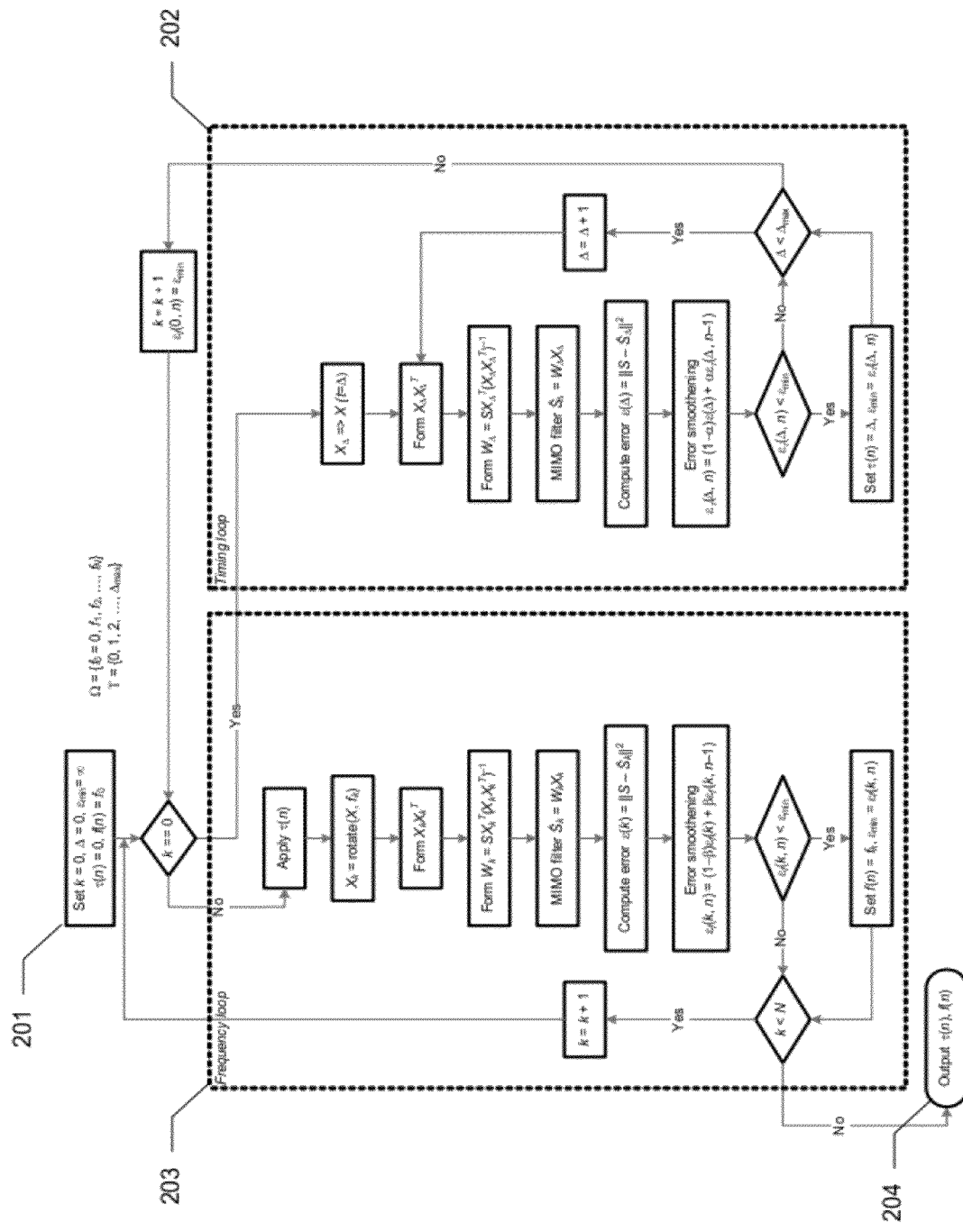
FIG. 2 is a flow chart illustrating a method for suppressing interference in accordance with one aspect of the subject technology.

To estimate an optimal parameter pair of time and frequency, the interference suppression filter can be serially tuned to each of a plurality of timing hypotheses, and the hypothesis corresponding to the lowest prediction error (using any known sequence, such as the midamble or a data aided quasi-midamble) is selected. Then the filter is serially tuned to each of a plurality of frequency hypotheses to determine which frequency hypothesis corresponds to a lowest prediction error. This serial approach is illustrated in accordance with one aspect of the subject disclosure in FIG. 2. Initially, the method begins by initializing a number of variables in block 201, including k (the frequency hypothesis number), Δ (the timing hypothesis number), $\epsilon_{min}$ (the lowest measured error), τ(n) (the optimal timing hypothesis number) and f(n) (the optimal frequency hypothesis number). The method proceeds to the timing loop 202 (as k is initialized to a zero value). In the timing loop, a set of spatial temporal samples are selected corresponding to timing hypothesis number Δ. Filter weights for a filter $W_\Delta$ are calculated based upon the timing hypothesis, as set forth in greater detail above, and the filter is applied to the symbols to estimate a midamble $\hat{S}_\Delta$. The error $\epsilon(\Delta)$ in the estimated midamble is determined based upon the previously known values for the midamble S. The error is smoothed, and is compared to $\epsilon_{min}$, the lowest calculated error thus far. As $\epsilon_{min}$ is initially set to ∞, the first iteration will necessarily involve redefining $\epsilon_{min}$ to the first calculated error value. Accordingly, τ(n), the optimal timing hypothesis yet calculated, will be set to Δ. Then, as long as Δ is less than $\Delta_{max}$ (the total number of hypotheses in the parameterized space), the hypothesis Δ is indexed by one, and timing loop 202 repeats. Once timing loop 202 has iteratively calculated errors for each timing hypothesis Δ, an optimal hypothesis τ(n) will have been selected, and the method proceeds to frequency loop 203. In a similar fashion to timing loop 202, frequency loop 203 iteratively calculates midamble estimation errors for each frequency hypothesis (at the optimal timing delay), and determines the optimal frequency hypothesis. In this manner, an optimal timing/frequency pair are serially determined from the parameterized timing/frequency subspace, and are used in the processing of the symbols to minimize errors arising from interference.

Figure 3:
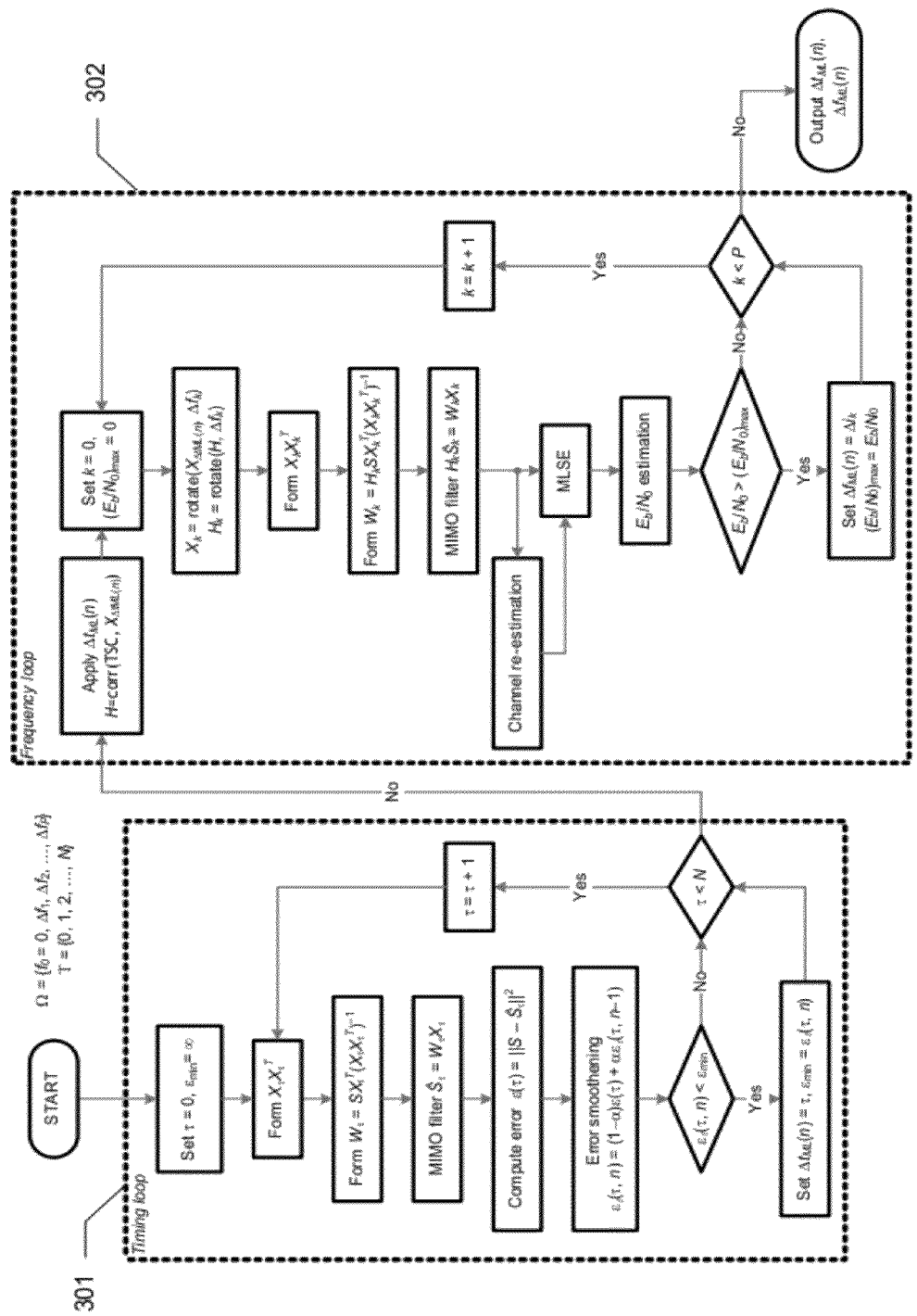
FIG. 3 is a flow chart illustrating a method for suppressing interference in accordance with one aspect of the subject technology.

According to one aspect of the subject disclosure, one drawback of using this algorithm for frequency synchronization is that the training sequence may be too short to reliably estimate small frequency offsets (e.g., on the order of few hundred Hz), as the curvature over midamble is essentially flat. Hence the need for an error smoothening filter, which makes the implementation more complicated in the field where the frequency offset between interferer and the desired signal can change from burst to burst. Accordingly, in order to obtain better and more accurate estimates on a burst to burst basis without the need to smoothen the midamble estimation error estimates, the signal to noise ratio may be used over the entire burst instead of the midamble estimation error, in accordance with one aspect of the subject disclosure. In order to obtain this signal to noise ratio, the burst is equalized (post MLSE) and the signal to noise ratio is determined using the hard decisions. This approach is illustrated in accordance with one aspect of the subject disclosure in FIG. 3. As can be seen with reference to FIG. 3, the timing loop includes an estimation of the signal to noise ratio ($E_b/N_0$), which estimation is used to In a manner similar to that illustrated in exemplary FIG. 2, the method illustrated in FIG. 3 includes a timing loop 301 and a frequency loop 302. In the timing loop, a set of spatial temporal samples are selected corresponding to timing hypothesis number τ. Filter weights for a filter $W_\tau$ are calculated based upon the timing hypothesis, as set forth in greater detail above, and the filter is applied to the symbols to estimate a midamble $\hat{S}_\tau$. The error $\epsilon_\tau$ in the estimated midamble is determined based upon the previously known values for the midamble S. The error is smoothed, and is compared to $\epsilon_{min}$, the lowest calculated error thus far. As $\epsilon E_{min}$ is initially set to ∞, the first iteration will necessarily involve redefining $\epsilon_{min}$ to the first calculated error value. Accordingly, $\Delta t_{ML}(n)$, the optimal timing hypothesis yet calculated, will be set to τ. Then, as long as τ is less than N (the total number of hypotheses in the parameterized space), the hypothesis τ is indexed by one, and timing loop 301 repeats. Once timing loop 301 has iteratively calculated errors for each timing hypothesis τ, an optimal hypothesis $\Delta t_{ML}(n)$ will have been selected, and the method proceeds to frequency loop 302. Frequency loop 302 iteratively calculates a signal to noise ratio for each frequency hypothesis (at the optimal timing delay), and determines the optimal frequency hypothesis. In this manner, an optimal timing/frequency pair are serially determined from the parameterized timing/frequency subspace, and are used in the processing of the symbols to minimize errors arising from interference.

According to one aspect, the signal to noise ratio $E_b/N_0$ determined in frequency loop 302 is based upon hard decisions. In this regard, the SNR may be equal to $\|\hat{H}\|_F/\|WX-\hat{H}\hat{S}\|^2$, where $\hat{S}$ is a Toeplitz matrix of estimated symbols after the equalization of the entire burst, which also includes the known training sequence S.

Figure 4:
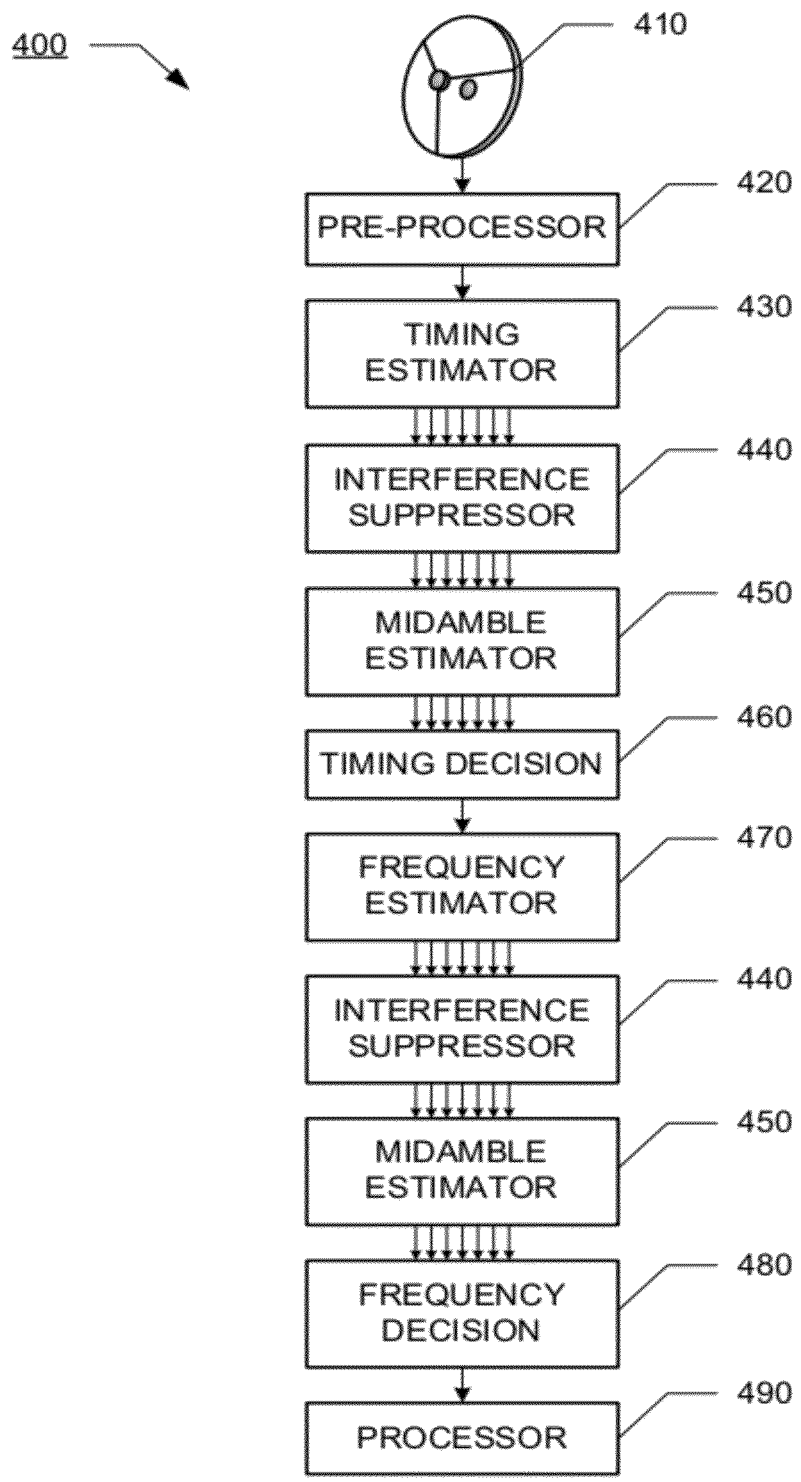
FIG. 4 illustrates a receiver for use in a wireless communication system in accordance with one aspect of the subject technology.

FIG. 4 illustrates a receiver for use in a wireless communication system in accordance with one aspect of the subject technology. Receiver 400 includes an antenna 410 configured to receive a wireless signal. While receiver 400 may be used in various communication systems, for clarity, receiver 400 is specifically described herein with respect to a GSM system. The received signal is provided to a pre-processor 420 which demodulates the signal to generate received samples. Pre-processor 420 may include a GMSK-to-BPSK rotator that performs phase rotation on the received samples. Timing estimator 430 receives the samples from pre-processor 420 and generates a plurality of timing hypotheses regarding where a training sequence of symbols (i.e., midamble) begins in the burst of data. Interference suppressor 440 iteratively performs single antenna interference cancellation on the symbols for each timing hypothesis, calculating different filter weights for each timing hypothesis, and midamble estimator 450 generates a midamble estimation error for each hypothesis, as described in greater detail above. Timing decision circuit 460 compares the midamble estimation errors for each hypothesis and selects the hypothesis with the lowest midamble estimation error. The selection of a hypothesis by timing decision circuit 460 represents the position in the burst of symbols where the midamble is estimated to begin. Frequency estimator 470 receives the samples from timing decision circuit 460 and generates a plurality of frequency hypotheses regarding a frequency on which symbols are transmitted. Interference suppressor 440 iteratively performs single antenna interference cancellation on the symbols for each frequency hypothesis, calculating different filter weights for each frequency hypothesis, and midamble estimator 450 generates a midamble estimation error for each hypothesis, as described in greater detail above. Frequency decision circuit 480 compares the midamble estimation errors for each hypothesis and selects the hypothesis with the lowest midamble estimation error. The selection of a hypothesis by frequency decision circuit 480 represents the optimal frequency at which to receive the burst of symbols. The signal is then provided to data processor 490, which processes the received symbols based upon the selected timing and frequency hypotheses, and outputs the data corresponding to the received symbols.

According to one aspect of the subject disclosure, timing estimator may generate a plurality of timing hypotheses by opening a "window" around the estimated beginning of the midamble sequence. The position of the first symbol of the midamble sequence can be estimated for a given burst, based upon the known structure of each burst. For example, as illustrated in FIG. 1, the beginning of midamble 104 in burst 103 begins in the 62nd bit of the burst. Based upon this known structure, timing estimator 430 selects a window 105 of bits representing a series of hypotheses regarding where the first midamble symbol may be located. Exemplary window 105 is illustrated in greater detail in FIG. 5.

Figure 5:
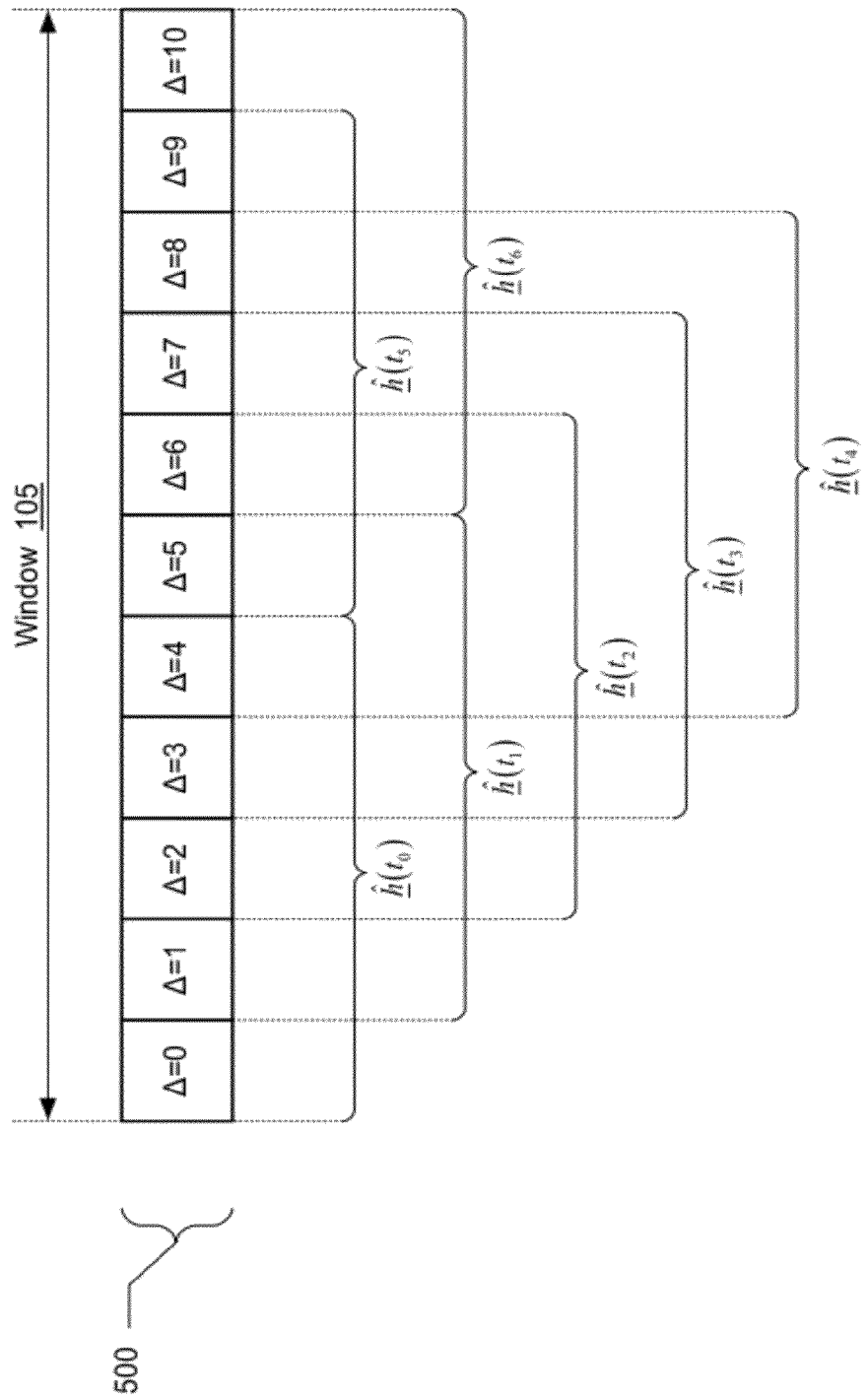
FIG. 5 illustrates a subset of symbols, including the first midamble symbol, that a receiver selects in accordance with one aspect of the subject technology.

As can be seen with reference to FIG. 5, exemplary window 105 comprises 11 symbols, labeled Δ=0 to Δ=10. Each Δ value represents the position of the symbol in the window. With reference to the position of a symbol in the entire burst, however, the Δ value is offset by an offset value (e.g., Δ=5 may be offset by 61 to represent the position of this symbol in the entire burst). For the first seven symbols in window 105, timing estimator 430 generates a channel estimate from a sequence of five contiguous symbols (representing the five-tap channel format of GSM). For example, symbol Δ=0 corresponds to channel estimate $\hat{h}(t_0)$, symbol Δ=1 corresponds to channel estimate $\hat{h}(t_1)$, etc. Each of these channel estimates is then processed by interference suppressor 440 and midamble estimator 450 to determine estimated midamble symbols corresponding thereto, in order to determine a midamble estimation error therefore.

While in the present exemplary aspect, window 105 has been illustrated as consisting of exactly 11 symbols, the scope of the present invention is not limited to such an arrangement. Rather, as will be readily apparent to one of skill in the art, any window size (up to the size of the entire data burst) may be selected. For example, in accordance with one aspect of the subject technology, the size of the search window may be chosen to be twice the size of the expected minimum propagation delay. Alternatively, the search window size may be parameterized based on any other metric known to those of skill in the art.

According to one aspect, a channel estimate $\hat{h}$ may be generated by timing estimator 430 by correlating the received samples (corresponding to the hypothesized delay) with the reference samples (i.e., the known midamble sequence) for each hypothesis. Based on the correlation $R_{ys}(\Delta)$ between received signal y and midamble sequence s for a hypothesized delay Δ, the channel estimate may be calculated as follows:

$$h^{(\delta)} = [R_{ys}(\delta), R_{ys}(\delta+1), \ldots, R_{ys}(\delta+4)] \text{ for } \delta=0,1,\ldots,6 \quad (1)$$

$$\delta^* = \underset{\delta}{\operatorname{argmax}}\{\|h_1^{(\delta)}\|^2\} \quad (2)$$

$$\hat{h} = [R_{ys}(\delta^*) R_{ys}(\delta^*+1) \ldots R_{ys}(\delta^*+4)]. \quad (3)$$

To test the hypothesis corresponding to each channel estimate, interference suppressor 440 performs SAIC on each estimated channel. SAIC is a method by which oversampled and/or real/imaginary decomposition of a signal is used to provide virtual antennas with separate sample sequences, such that weights may be applied to the virtual antennas to form a beam in the direction of a desired transmitter and a beam null in the direction of an undesired interference source. In general, SAIC may be achieved with one or multiple actual antennas at the receiver by using space-time processing, where "space" may be virtually achieved with inphase and quadrature components, and "time" may be achieved using late and early samples.

For example, given a set of spatial and temporal samples at a time k:

$$x_k = \begin{bmatrix} x_k(1) \\ x_k(2) \\ \vdots \\ x_k(M) \end{bmatrix}, \underline{s}_k = \begin{bmatrix} s_k \\ s_{k-1} \\ \vdots \\ s_{k-\upsilon} \end{bmatrix}$$

where $s_k$ is the midamble/quasi-midamble signal at time k, $\underline{s}_k$ is a $(\upsilon+1) \times 1$ midamble/quasi-midamble vector, and $x_k$ is a M×1 received midamble/quasi-midamble vector, a set of spatial temporal samples can be defined as $$X_k = \begin{bmatrix} x_k \\ x_{k-1} \\ \vdots \\ x_{k-L} \end{bmatrix},$$

where $X_k$ is a M×(L+1)×1 vector of spatial temporal samples with a spatial length of M and a temporal length of L+1. Accordingly, a spatial/temporal structured matrix can be constructed, such that $$[X] = [X_k X_{k+1} \ldots X_{k+p-\upsilon}],$$

where [X] is a M(L+1)×p−υ matrix, and p is the length of the midamble or quasi-midamble (data aided).

Accordingly, given [X] and $\tilde{s}_k = [\underline{s}_k \underline{s}_{k+1}, \ldots \underline{s}_{k+p-\upsilon}]$, $(\upsilon+1) \times$ p−υ, a suppression filter $W_{SAIC}$ can be computed according to one aspect of the subject disclosure by estimating a reference sequence of symbols at the channel input:

$$W_{SAIC} = \arg \min \|W[X] - \tilde{Z}\|^2 \quad (4)$$

where $W=(\upsilon+1) \times M(L+1)$ and $\tilde{Z} = \tilde{s}_k, (\upsilon+1) \times (p-\upsilon)$.

The foregoing equation can be rewritten as $$W_{SAIC} = \tilde{Z}[X]^\dagger, (\upsilon+1) \times M(L+1) \quad (5)$$

or, more particularly, as $$W_{SAIC} = \tilde{s}_k [X]^T \{[X][X]^T\}^{-1}. \quad (6)$$

The output of interference suppressor 440 is in the form $\hat{S}$, where $\hat{S}$ represents an estimate of the midamble sequence. The difference between the estimated and known midamble sequences is determined according to Equation 7, below:

$$\|S - \hat{S}\|^2 = e_m(t_i) \quad (7)$$

to obtain a midamble estimation error $e_m(t_i)$ for each time $t_i$. Each time $t_i$ is equal to the hypothesized position $\Delta_i$ plus an offset $T_s$ from the beginning of the burst:

$$t_i = \Delta_i + T_s \quad (8)$$

Once the midamble estimation error $e_m(t_i)$ for each time $t_i$ is determined, timing decision block 460 determines which hypothesis corresponds to the lowest estimation error $e_m$, and the other hypothesized timing values are discarded.

According to one aspect of the subject disclosure, the foregoing method for interference suppression enjoys a number of benefits when compared to a method utilizing channel output beamforming. For example, as can be seen with reference to Equation 4, the interference suppression filter weights are calculated by minimizing the cost function $$J = \min(\|W[X] - S\|^2). \quad (9)$$

Accordingly, the suppression filter weights (of Equation 6) have the dimensionality of υ×M(L+1), and the filtered output has the dimensionality of υ×(p−υ). Accordingly, the size of the filter weights grows linearly with the number of antennas (whether real or virtual), and the size of the filtered output sample matrix remains constant even as the number of antennas (or virtual antennas) grows. This offers dramatic improvements in computational simplicity and storage requirements over a channel output setup, in which the interference suppression filter weights are calculated by minimizing the cost function $$J = \min(\|W[X] - HS\|^2), \quad (10)$$

which results in suppression filter weights with a dimensionality of M×M (L+1) and a filtered output with a dimensionality of M×(p−υ) (i.e., where the number of filter weights scale geometrically with the number of antennas, and where the size of the filtered output sample matrix increases linearly with the number of antennas).

Such a channel output setup further involves greater storage and backend ISI equalization using non-linear equalizers (such as an MLSE, where the number of input streams must be set equal to M). In the channel input setup, the number of input streams for the backend ISI equalization is only υ, and the number of back-substitutions in the computation of the filter weights is reduced (not being proportional to the number of antennas, as in the channel output setup). Despite the computational simplicity, however, the performance of the system is at least as good as, if not better than, the channel output setup. In this regard, the channel input setup provides good robustness against channel estimation error, which tends to dominate the performance of a GERAN receiver when interference is present.

According to one aspect of the subject disclosure, data processor 490 comprises a soft output generator that receives the signal from frequency decision block 480 and generates soft decisions that indicate the confidence in the detected bits. A soft output generator may implement an Ono algorithm, as is well known to those of skill in the art. Data processor 490 may further comprise a de-interleaver that de-interleaves the soft decisions, and passes the soft decisions to a Viterbi decoder that decodes the deinterleaved soft decisions and outputs decoded data.

Figure 6:
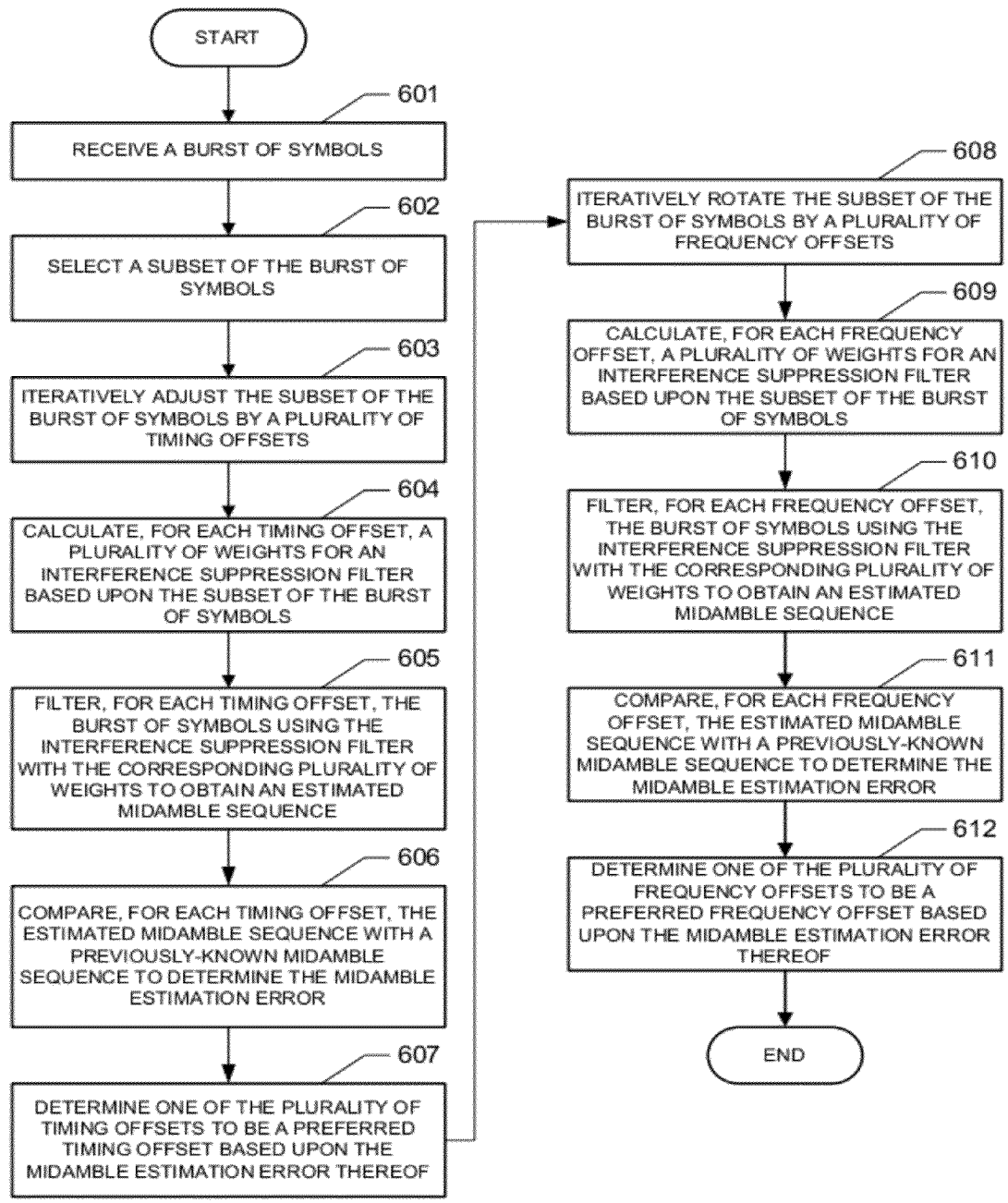
FIG. 6 illustrates a method for suppressing interference in accordance with one aspect of the subject technology.

FIG. 6 illustrates a method for suppressing interference in accordance with one aspect of the subject technology. The method begins in step 601, in which a burst of symbols are received. In step 602, a subset of the burst of symbols is selected. According to one aspect of the subject disclosure, the subset of the burst of symbols includes a first midamble symbol. In step 603, the subset selected in step 602 is iteratively adjusted by a plurality of timing offsets. In step 604, a plurality of weights for an interference filter are calculated for each timing offset, based upon the burst of symbols. In step 605, the burst of symbols are filtered, for each timing offset, using the interference suppression filter with the corresponding plurality of weights to determine an estimated midamble sequence. In step 606, the estimated midamble sequence for each timing offset is compared to a previously known midamble sequence to determine a midamble estimation error for that timing offset. One of the plurality of timing offsets is determined, in step 607, to be a preferred timing offset, based upon the midamble estimation error thereof. According to one aspect of the subject disclosure, the preferred midamble timing offset is the timing offset corresponding to the lowest midamble estimation error. In step 608, the subset of the burst of symbols are iteratively rotated by a plurality of frequency offsets. In step 609, a plurality of weights for an interference filter are calculated for each frequency offset, based upon the burst of symbols. In step 610, the burst of symbols are filtered, for each frequency offset, using the interference suppression filter with the corresponding plurality of weights to determine an estimated midamble sequence. In step 611, the estimated midamble sequence for each frequency offset is compared to a previously known midamble sequence to determine a midamble estimation error for that frequency offset. One of the plurality of frequency offsets is determined, in step 612, to be a preferred frequency offset, based upon the midamble estimation error thereof.

According to one aspect of the subject disclosure, a parallel approach to locating an optimal frequency/timing hypothesis pair may be utilized, with a corresponding increase in computational complexity over a serial approach (e.g., where there are 5 frequency hypotheses and 7 timing hypotheses, a serial approach may involve determining a prediction error 12 times, whereas a parallel approach will involve determining a prediction error 35 times). Nevertheless, a parallel approach may provide even more accurate estimation of timing and frequency for improved performance.

Figure 7:
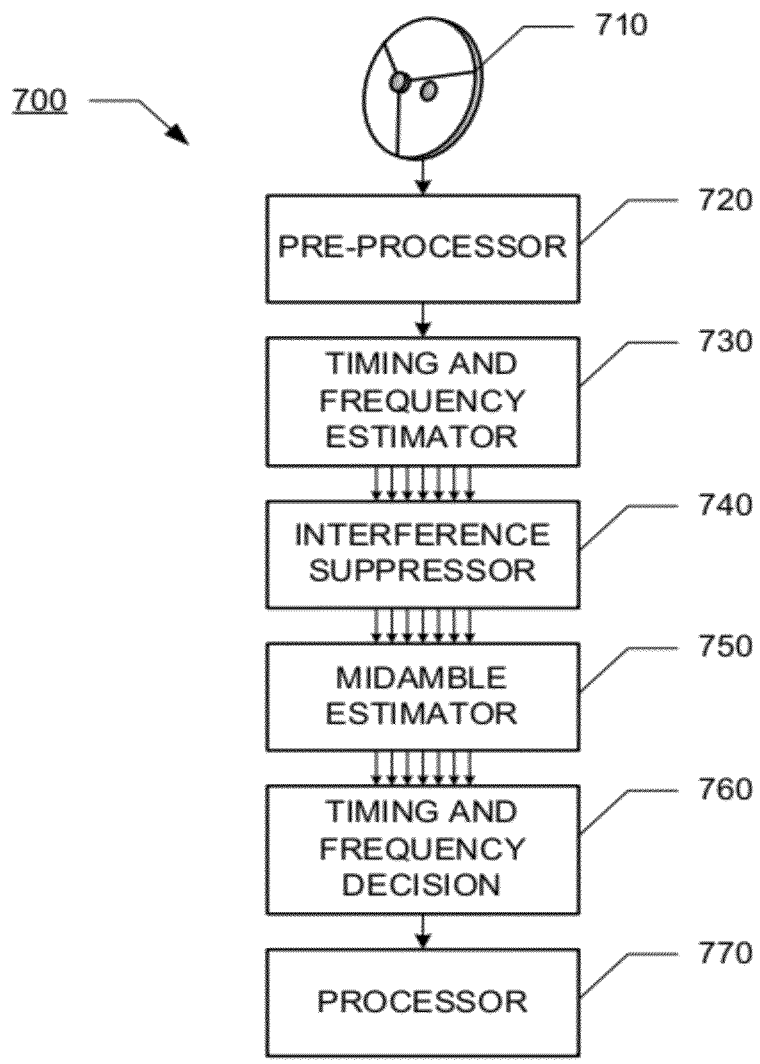
FIG. 7 illustrates a receiver for use in a wireless communication system in accordance with one aspect of the subject technology.

FIG. 7 illustrates a receiver for use in a wireless communication system in accordance with one aspect of the subject technology. Receiver 700 includes an antenna 710 configured to receive a wireless signal. The received signal is provided to a pre-processor 720 which demodulates the signal to generate received samples. Pre-processor 720 may include a GMSK-to-BPSK rotator that performs phase rotation on the received samples. Timing and frequency estimator 730 receives the samples from pre-processor 720 and generates a plurality of timing and frequency hypotheses regarding where a training sequence of symbols (i.e., midamble) begins in the burst of data (timing) and at which frequency the symbols can be optimally received (frequency). Interference suppressor 740 iteratively performs single antenna interference cancellation on the symbols for each timing and frequency hypothesis pair, calculating different filter weights for each hypothesis pair, and midamble estimator 750 generates a midamble estimation error for each hypothesis pair, as described in greater detail above. Timing and frequency decision circuit 760 compares the midamble estimation errors for each hypothesis pair and selects the pair with the lowest midamble estimation error. The selection of a hypothesis pair by timing and frequency decision circuit 760 represents the position in the burst of symbols where the midamble is estimated to begin, and the optimal frequency at which to receive the burst of symbols. The signal is then provided to data processor 770, which processes the received symbols based upon the selected timing and frequency hypotheses, and outputs the data corresponding to the received symbols.

Figure 8:
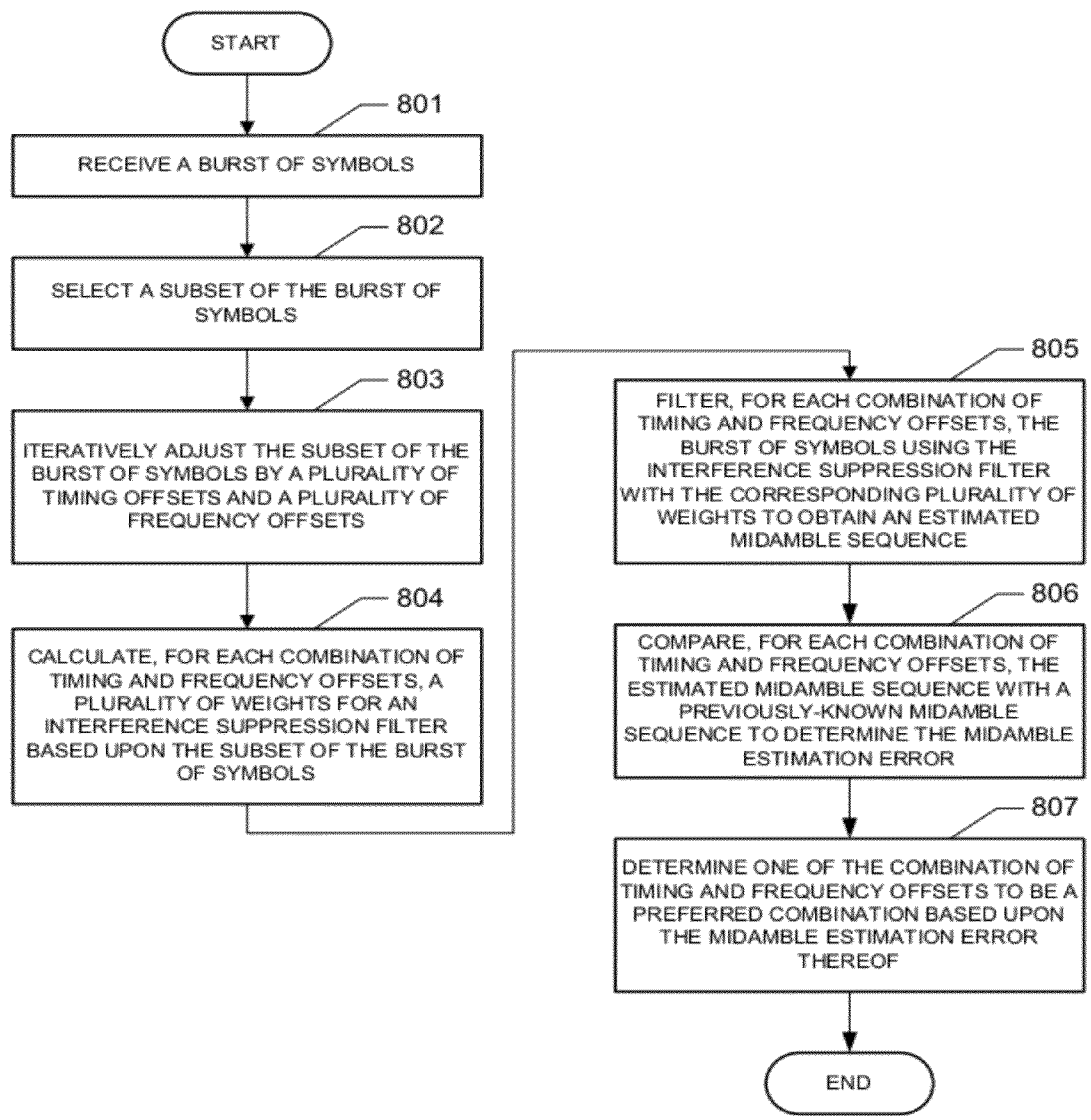
FIG. 8 illustrates a method for suppressing interference in accordance with one aspect of the subject technology.

FIG. 8 illustrates a method for suppressing interference in accordance with one aspect of the subject technology. The method begins in step 801, in which a burst of symbols are received. In step 802, a subset of the burst of symbols is selected. According to one aspect of the subject disclosure, the subset of the burst of symbols includes a first midamble symbol. In step 803, the subset selected in step 802 is iteratively adjusted by a plurality of timing and frequency offsets. In step 804, a plurality of weights for an interference filter are calculated for each timing and frequency offset pair, based upon the burst of symbols. In step 805, the burst of symbols are filtered, for each pair of offsets, using the interference suppression filter with the corresponding plurality of weights to determine an estimated midamble sequence. In step 806, the estimated midamble sequence for each offset pair is compared to a previously known midamble sequence to determine a midamble estimation error for that timing offset. One of the plurality combination of timing and frequency offsets is determined, in step 807, to be a preferred combination, based upon the midamble estimation error thereof According to one aspect of the subject disclosure, the preferred combination is the combination corresponding to the lowest midamble estimation error.

Figure 9:
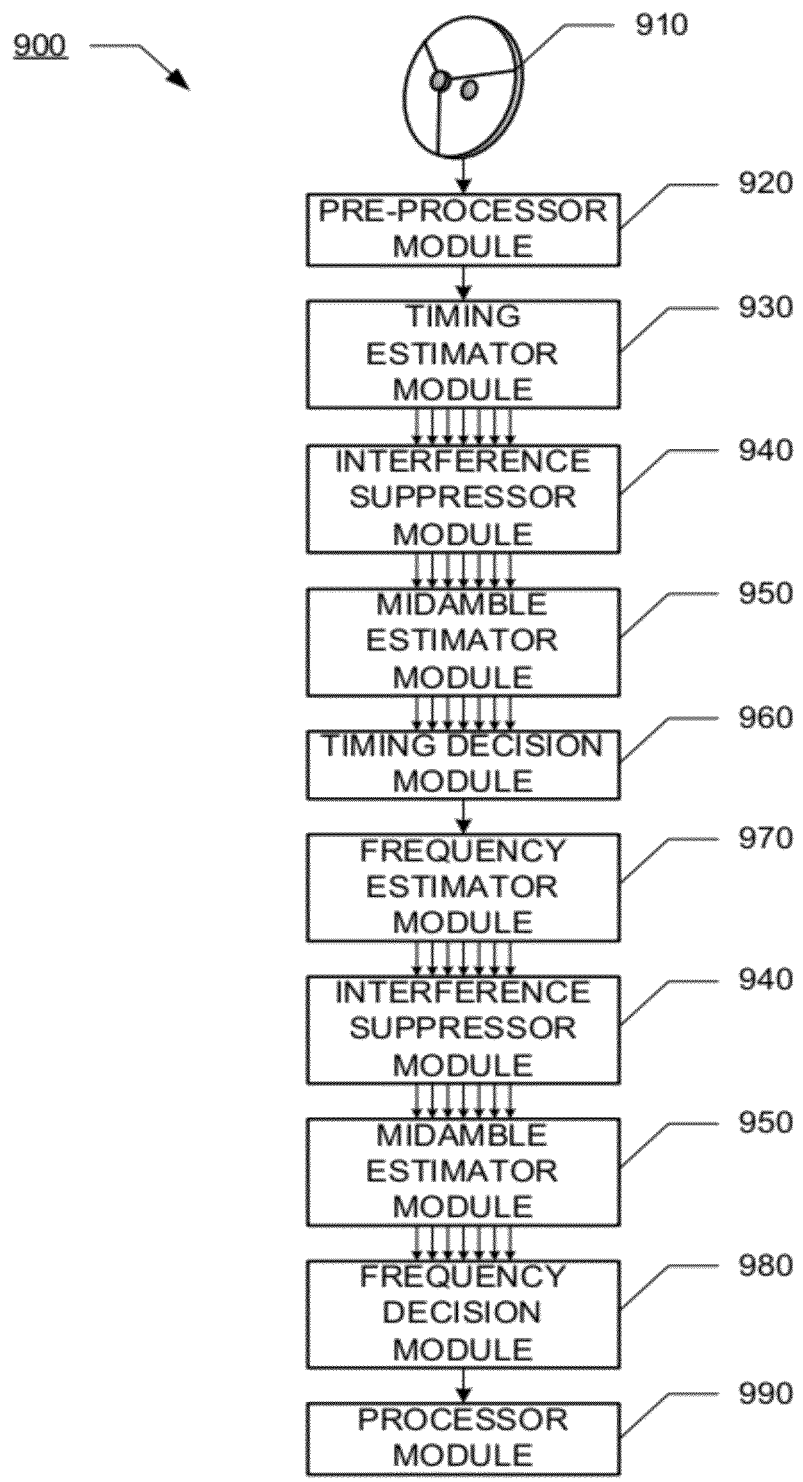
FIG. 9 illustrates a receiver for use in a wireless communication system in accordance with one aspect of the subject technology.

FIG. 9 illustrates a receiver for use in a wireless communication system in accordance with one aspect of the subject technology. Receiver 900 includes an antenna module 910 configured to receive a wireless signal. While receiver 900 may be used in various communication systems, for clarity, receiver 900 is specifically described herein with respect to a GSM system. The received signal is provided to a pre-processor module 920 which demodulates the signal to generate received samples. Pre-processor module 920 may include a GMSK-to-BPSK rotator that performs phase rotation on the received samples. Timing estimator module 930 receives the samples from pre-processor module 920 and generates a plurality of timing hypotheses regarding where a training sequence of symbols (i.e., midamble) begins in the burst of data. Interference suppressor module 940 iteratively performs single antenna interference cancellation on the symbols for each timing hypothesis, calculating different filter weights for each timing hypothesis, and midamble estimator module 950 generates a midamble estimation error for each hypothesis, as described in greater detail above. Timing decision circuit 960 compares the midamble estimation errors for each hypothesis and selects the hypothesis with the lowest midamble estimation error. The selection of a hypothesis by timing decision module 960 represents the position in the burst of symbols where the midamble is estimated to begin. Frequency estimator module 970 receives the samples from timing decision module 960 and generates a plurality of frequency hypotheses regarding a frequency on which symbols are transmitted. Interference suppressor module 940 iteratively performs single antenna interference cancellation on the symbols for each frequency hypothesis, calculating different filter weights for each frequency hypothesis, and midamble estimator module 950 generates a midamble estimation error for each hypothesis, as described in greater detail above. Frequency decision circuit 980 compares the midamble estimation errors for each hypothesis and selects the hypothesis with the lowest midamble estimation error. The selection of a hypothesis by frequency decision module 980 represents the optimal frequency at which to receive the burst of symbols. The signal is then provided to data processor module 990, which processes the received symbols based upon the selected timing and frequency hypotheses, and outputs the data corresponding to the received symbols.

Figure 10:
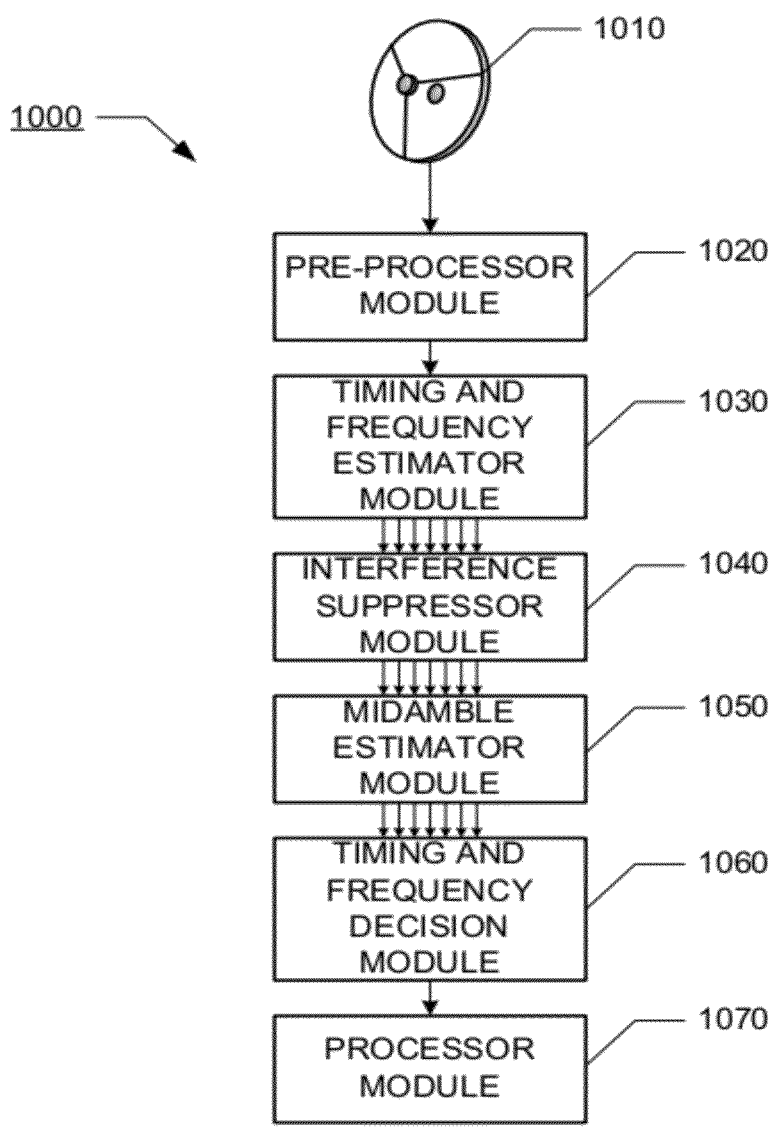
FIG. 10 illustrates a receiver for use in a wireless communication system in accordance with one aspect of the subject technology.

FIG. 10 illustrates a receiver for use in a wireless communication system in accordance with one aspect of the subject technology. Receiver 1000 includes an antenna module 1010 configured to receive a wireless signal. The received signal is provided to a pre-processor module 1020 which demodulates the signal to generate received samples. Pre-processor module 1020 may include a GMSK-to-BPSK rotator that performs phase rotation on the received samples. Timing and frequency estimator module 1030 receives the samples from pre-processor module 1020 and generates a plurality of timing and frequency hypotheses regarding where a training sequence of symbols (i.e., midamble) begins in the burst of data (timing) and at which frequency the symbols can be optimally received (frequency). Interference suppressor module 1040 iteratively performs single antenna interference cancellation on the symbols for each timing and frequency hypothesis pair, calculating different filter weights for each hypothesis pair, and midamble estimator module 1050 generates a midamble estimation error for each hypothesis pair, as described in greater detail above. Timing and frequency decision module 1060 compares the midamble estimation errors for each hypothesis pair and selects the pair with the lowest midamble estimation error. The selection of a hypothesis pair by timing and frequency decision module 1060 represents the position in the burst of symbols where the midamble is estimated to begin, and the optimal frequency at which to receive the burst of symbols. The signal is then provided to data processor module 1070, which processes the received symbols based upon the selected timing and frequency hypotheses, and outputs the data corresponding to the received symbols.

Figure 11:
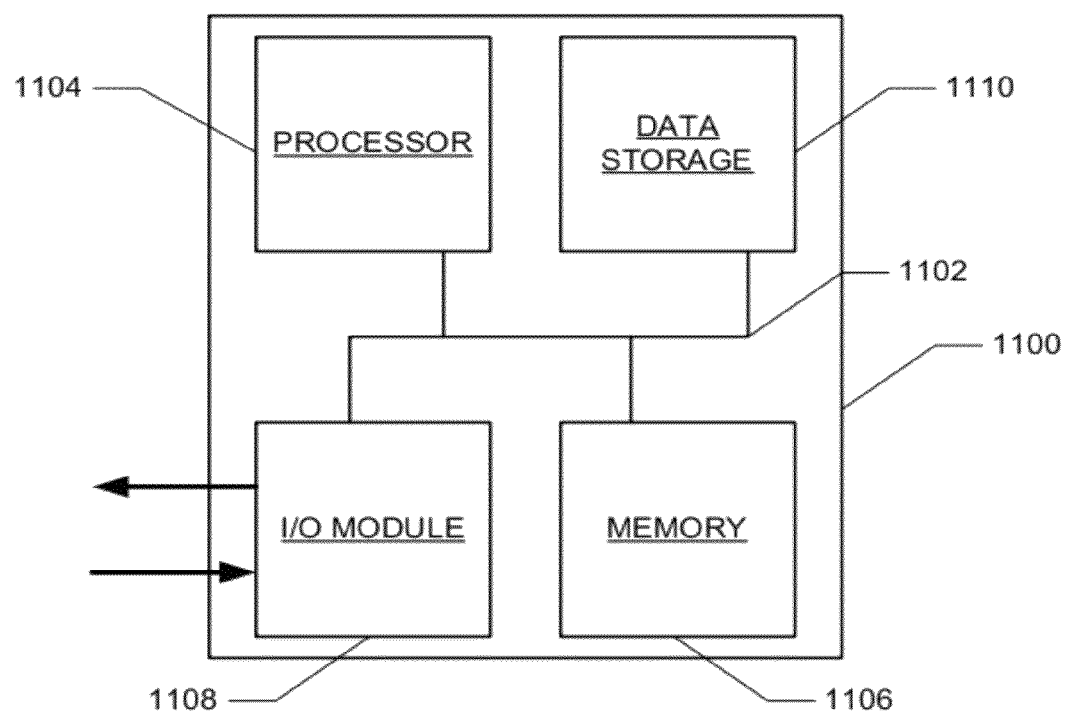
FIG. 11 is a block diagram illustrating a computer system with which certain aspects of the subject technology may be implemented.

FIG. 11 is a block diagram that illustrates a computer system 1100 upon which an aspect may be implemented. Computer system 1100 includes a bus 1102 or other communication mechanism for communicating information, and a processor 1104 coupled with bus 1102 for processing information. Computer system 1100 also includes a memory 1106, such as a random access memory ("RAM") or other dynamic storage device, coupled to bus 1102 for storing information and instructions to be executed by processor 1104. Memory 1106 may also be used for storing temporary variable or other intermediate information during execution of instructions to be executed by processor 1104. Computer system 1100 further includes a data storage device 1110, such as a magnetic disk or optical disk, coupled to bus 1102 for storing information and instructions.

Computer system 1100 may be coupled via I/O module 1108 to a display device (not illustrated), such as a cathode ray tube ("CRT") or liquid crystal display ("LCD") for displaying information to a computer user. An input device, such as, for example, a keyboard or a mouse may also be coupled to computer system 1100 via I/O module 1108 for communicating information and command selections to processor 1104.

According to one aspect, timing and frequency estimation is performed by a computer system 1100 in response to processor 1104 executing one or more sequences of one or more instructions contained in memory 1106. Such instructions may be read into memory 1106 from another machine-readable medium, such as data storage device 1110. Execution of the sequences of instructions contained in main memory 1106 causes processor 1104 to perform the process steps described herein. One or more processors in a multi-processing arrangement may also be employed to execute the sequences of instructions contained in memory 1106. In alternative aspects, hard-wired circuitry may be used in place of or in combination with software instructions to implement various aspects. Thus, aspects are not limited to any specific combination of hardware circuitry and software.

The term "machine-readable medium" as used herein refers to any medium that participates in providing instructions to processor 1104 for execution. Such a medium may take many forms, including, but not limited to, non-volatile media, volatile media, and transmission media. Non-volatile media include, for example, optical or magnetic disks, such as data storage device 1110. Volatile media include dynamic memory, such as memory 1106. Transmission media include coaxial cables, copper wire, and fiber optics, including the wires that comprise bus 1102. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for coherent interference suppression in a wireless communication system, comprising the steps of:
   receiving a burst of symbols;
   generating a plurality of timing hypotheses for the burst of symbols using a set of known reference symbols and a subset of the received burst of symbols in a channel input configuration, wherein the generating the plurality of timing hypotheses comprises estimating a position of a reference symbol in the burst of symbols and selecting the subset of the burst of symbols from symbols centered around the estimated position of the reference symbol;
   for each timing hypothesis:
   calculating a plurality of weights fur an interference suppression filter based on minimizing a cost function associated with each timing hypothesis of the subset of the burst of symbols;

filtering the burst of symbols using the interference suppression filter with the corresponding plurality of weights for calculating an estimation error for each timing hypothesis by comparing an estimated set of reference symbols with the known set of known reference symbols to determine the estimation error,
wherein size of the plurality of weights increases linearly with a number of antennas receiving the burst of symbols, and output size of the filtering the burst of symbols remains constant;
selecting one of the plurality of timing hypotheses corresponding to a selection criteria based on the determined estimation error;
equalizing the filtered burst of symbols based upon the selected one of the plurality of timing hypotheses; and
decoding the filtered burst of symbols based upon the selected one of the plurality of timing hypotheses.

2. The method of claim 1, wherein minimizing the cost function excludes performing channel estimation.

3. The method of claim 2, wherein the cost function comprises calculating
J=min ($||W[X]-S||^2$), where W is the plurality of weights, [X] is a matrix of spatial temporal samples of the burst of symbols, and S is a midamble sequence.

4. The method of claim 1, wherein the selection criteria comprises a midambie estimation error.

5. The method of claim 1, wherein generating the plurality of timing hypotheses comprises estimating a position of a first midambie symbol in the burst of symbols and selecting the subset of the burst of symbols from symbols centered around the estimated position of the first midamble symbol.

6. The method of claim 1, wherein the plurality of weights for each timing hypothesis are calculated by solving for $W_{SAIC}=\tilde{\underline{s}}_k[X]^T\{[X][X]^T\}^{-1}$,
where $\tilde{\underline{s}}_k$ is a vector corresponding to an estimate of the subset of the burst of symbols, [X] is a matrix of spatial temporal samples of the burst of symbols, and $[X]^T$ is a transpose of [X].

7. The method of claim 1, wherein the interference suppression filter comprises a single antenna interference cancellation (SAIC) filter.

8. The method of claim 1, wherein the interference suppression filter comprises a dual antenna interference cancellation (DAIC) filter.

9. The method of claim 1, wherein the size of the plurality of weights has a dimensionality of υ×M (L+1), where υ is a number of symbol streams, M is a spatial length of the subset of the received burst of symbols, and L is a temporal length of the subset of the received burst of symbols.

10. The method of claim 9, wherein the interference suppression filter comprises a maximum likelihood sequence estimator (MLSE).

11. The method of claim 1, wherein the output size of the filtering the burst of symbols is υ×(p−υ), where υ is a number of symbol streams and p is a length of the estimated set of reference symbols.

12. The method of claim 11, wherein the interference suppression filter comprises a maximum likelihood sequence estimator (MLSE).

13. The method of claim 1, wherein the interference suppression is performed in a mobile device in the wireless communication system.

14. The method of claim 1, wherein the interference suppression is performed in a base station in the wireless communication system.

15. A receiver comprising:
at least one antenna configured to receive a burst of symbols;
a timing estimator configured to generate a plurality of timing hypotheses for the burst of symbols using a set of known reference symbols and a subset of the received burst of symbols in a channel input configuration, wherein the generating the plurality of timing hypotheses comprises estimating a position of a reference symbol in the burst of symbols and selecting the subset of the burst of symbols from symbols centered around the estimated position of the reference symbol;
a processor configured to calculate, for each timing hypothesis, a plurality of weights for an interference suppression filter based on minimizing a cost function associated with each timing hypothesis of the subset of the burst of symbols;
an interference suppression filter configured, for reach timing hypothesis, to filter the burst of symbols using the corresponding plurality of weights for calculating an estimation error for each timing hypothesis by comparing an estimated set of reference symbols with the known set of known reference symbols to determine the estimation error, wherein size of the plurality of weights increases linearly with a number of antennas receiving the burst of symbols, and output size of the filtering the burst of symbols remains constant;
the processor being further configured to select one of the plurality of timing hypotheses corresponding to a selection criteria based on the determined estimation error;
an equalizer configured to equalize the filtered burst of symbols based on the selected one of the plurality of timing hypotheses; and
a decoder configured to decode the filtered burst of symbols based upon the selected one of the plurality of timing hypotheses.

16. The receiver of claim 15, wherein minimizing the cost function excludes performing channel estimation.

17. The receiver of claim 16, wherein the cost function comprises calculating
J=min ($||W[X]-S||^2$), where W is the plurality of weights, [X] is a matrix of spatial temporal samples of the burst of symbols, and S is a midamble sequence.

18. The receiver of claim 15, wherein the selection criteria comprises a midamble estimation error.

19. The receiver of claim 15, wherein generating the plurality of timing hypotheses comprises estimating a position of a first midamble symbol in the burst of symbols and selecting the subset of the burst of symbols from symbols centered around the estimated position of the first midamble symbol.

20. The receiver of claim 15, wherein the plurality of weights for each timing hypothesis are calculated by solving for $$W_{SAIC}=\tilde{\underline{s}}_k[X]^T\{[X][X]^T\}^{-1},$$

where $\tilde{\underline{s}}_k$ is a vector corresponding to an estimate of the subset of the burst of symbols, [X] is a matrix of spatial temporal samples of the burst of symbols, and $[X]^T$ is a transpose of [X].

21. The receiver of claim 15, wherein the interference suppression filter comprises a single antenna interference cancellation (SAIC) filter.

22. The receiver of claim 15, wherein the interference suppression filter comprises a dual antenna interference cancellation (DAIC) filter.

23. The receiver of claim 15, wherein the size of the plurality of weights has a dimensionality of υ×M (L+1), where υ is a number of symbol streams, M is a spatial length of the subset of the received burst of symbols, and L is a temporal length of the subset of the received burst of symbols.

24. The receiver of claim 23, wherein the interference suppression filter comprises a maximum likelihood sequence estimator (MLSE).

25. The receiver of claim 15, wherein the output size of the filtering the burst of symbols is υ×(p−υ), where υ is a number of symbol streams and p is a length of the estimated set of reference symbols.

26. The receiver of claim 25, wherein the interference suppression filter comprises a maximum likelihood sequence estimator (MLSE).

27. The receiver of claim 15, wherein the receiver is located in a mobile device.

28. The receiver of claim 15, wherein the receiver is located in a base station.

29. A receiver comprising:
   means for receiving a burst of symbols;
   means for generating a plurality of timing hypotheses for the burst of symbols using a set of known reference symbols and a subset of the received burst of symbols in a channel input configuration, wherein the generating the plurality of timing hypotheses comprises estimating a position of a reference symbol in the burst of symbols and selecting the subset of the burst of symbols from symbols centered around the estimated position of the reference symbol;
   means for calculating, for each timing hypothesis, a plurality of weights for interference suppression means based on minimizing a cost function associated with each timing hypothesis of the subset of the burst of symbols;
   interference suppression means configured, for reach timing hypothesis, to filter the burst of symbols using the corresponding plurality of weights for calculating an estimation error for each timing hypothesis by comparing an estimated set of reference symbols with the known set of known reference symbols to determine the estimation error, wherein size of the plurality of weights increases linearly with a number of antennas receiving the burst of symbols, and output size of the filtering the burst of symbols remains constant;
   means for selecting one of the plurality of timing hypotheses corresponding to a selection criteria based on the determined estimation error;
   means for equalizing the filtered burst of symbols based on the selected one of the plurality of timing hypotheses; and
   means for decoding the filtered burst of symbols based upon the selected one of the plurality of timing hypotheses.

30. The receiver of claim 29, wherein minimizing the cost function excludes performing channel estimation.

31. The receiver of claim 30, wherein the cost function comprises calculating
   $J = \min(\|W[X] - S\|^2)$, where W is the plurality of weights, [X] is a matrix of spatial temporal samples of the burst of symbols, and S is a midamble sequence.

32. The receiver of claim 29, wherein the selection criteria comprises a midamble estimation error.

33. The receiver of claim 29, wherein generating the plurality of timing hypotheses comprises estimating a position of a first midamble symbol in the burst of symbols and selecting the subset of the burst of symbols from symbols centered around the estimated position of the first midamble symbol.

34. The receiver of claim 29, wherein the plurality of weights for each timing hypothesis are calculated by solving for $W_{SAIC} = \tilde{\underline{s}}_k [X]^T \{[X][X]^T\}^{-1}$, where $\tilde{\underline{s}}_k$ is a vector corresponding to an estimate of the subset of the burst of symbols, [X] is a matrix of spatial temporal samples of the burst of symbols, and $[X]^T$ is a transpose of [X].

35. The receiver of claim 29, wherein the interference suppression means comprises a single antenna interference cancellation (SAIC) filter.

36. The receiver of claim 29, wherein the interference suppression means comprises a dual antenna interference cancellation (DAIC) filter.

37. The receiver of claim 29, wherein the size of the plurality of weights has a dimensionality of υ×M (L+1), where υ is a number of symbol streams, M is a spatial length of the subset of the received burst of symbols, and L is a temporal length of the subset of the received burst of symbols.

38. The receiver of claim 37, wherein the interference suppression means comprises a maximum likelihood sequence estimator (MLSE).

39. The receiver of claim 29, wherein the output size of the filtering the burst of symbols is υ×(p−υ), where υ is a number of symbol streams and p is a length of the estimated set of reference symbols.

40. The receiver of claim 39, wherein the interference suppression means comprises a maximum likelihood sequence estimator (MLSE).

41. The receiver of claim 29, wherein the receiver is located in a mobile device.

42. The receiver of claim 29, wherein the receiver is located in a base station.

43. A system comprising:
   an interface to at least one antenna configured to receive a burst of symbols; and
   a processor, configured to communicate with the at least one antenna via the interface, the processor being configured to:
   generate a plurality of timing hypotheses for the burst of symbols using a set of known reference symbols and a subset of the received burst of symbols in a channel input configuration, wherein the generating the plurality of timing hypotheses comprises estimating a position of a reference symbol in the burst of symbols and selecting the subset of the burst of symbols from symbols centered around the estimated position of the reference symbol,
   calculate, for each timing hypothesis, a plurality of weights for an interference suppression filtering process based on minimizing a cost function associated with each timing hypothesis of the subset of the burst of symbols,
   filter the burst of symbols using the corresponding plurality of weights for calculating an estimation error for each timing hypothesis by comparing an estimated set of reference symbols with the known set of known reference symbols to determine the estimation error, wherein size of the plurality of weights increases linearly with a number of antennas receiving the burst of symbols, and output size of the filtering the burst of symbols remains constant,
   select one of the plurality of timing hypotheses corresponding to a selection criteria based on the determined estimation error,
   equalize the filtered burst of symbols based on the selected one of the plurality of timing hypotheses, and decode the filtered burst of symbols based upon the selected one of the plurality of timing hypotheses.

44. The system of claim 43, wherein minimizing the cost function excludes performing channel estimation.

45. The system of claim 44, wherein the cost function comprises calculating
J=min ($\|W[X]-S\|^2$), where W is the plurality of weights, [X] is a matrix of spatial temporal samples of the burst of symbols, and S is a midamble sequence.

46. The system of claim 43, wherein the selection criteria comprises a midamble estimation error.

47. The system of claim 43, wherein generating the plurality of timing hypotheses comprises estimating a position of a first midamble symbol in the burst of symbols and selecting the subset of the burst of symbols from symbols centered around the estimated position of the first midamble symbol.

48. The system of claim 43, wherein the plurality of weights for each timing hypothesis are calculated by solving for $$W_{SAIC} = \tilde{s}_k[X]^T\{[X][X]^T\}^{-1},$$

where $\tilde{s}_k$ is a vector corresponding to an estimate of the subset of the burst of symbols, [X] is a matrix of spatial temporal samples of the burst of symbols, and $[X]^T$ is a transpose of [X].

49. The system of claim 43, wherein the interference suppression filter process comprises a single antenna interference cancellation (SAIC) filter process.

50. The system of claim 43, wherein the interference suppression filter process comprises a dual antenna interface cancellation (DAIC) filter process.

51. The system of claim 43, wherein the size of the plurality of weights has a dimensionality of υ×M (L+1), where υ is a number of symbol streams, M is a spatial length of the subset of the received burst of symbols, and L is a temporal length of the subset of the received burst of symbols.

52. The system of claim 51, wherein the interference suppression filter process comprises a maximum likelihood sequence estimator (MLSE) process.

53. The system of claim 43, wherein the output size of the filtering the burst of symbols is υ×(p−υ), where υ is a number of symbol streams and p is a length of the estimated set of reference symbols.

54. The system of claim 53, wherein the interference suppression filter process comprises a maximum likelihood sequence estimator (MLSE) process.

55. The system of claim 43, wherein the system is located in a mobile device.

56. The system of claim 43, wherein the system is located in a base station.

57. The system of claim 43, wherein the processor comprises a general-purpose programmable processor.

58. The system of claim 43, wherein the processor comprises an application-specific integrated circuit (ASIC).

59. A non-transitory machine-readable medium, comprising instructions for suppressing interference in a wireless communication system, the instructions comprising code for:
receiving a burst of symbols;
generating a plurality of timing hypotheses for the burst of symbols using a set of known reference symbols and a subset of the received burst of symbols in a channel input configuration, wherein the generating the plurality of timing hypotheses comprises estimating a position of a reference symbol in the burst of symbols and selecting the subset of the burst of symbols from symbols centered around the estimated position of the reference symbol;
for each timing hypothesis:
calculating a plurality of weights for an interference suppression filter based on minimizing a cost function associated with each timing hypothesis of the subset of the burst of symbols;
filtering the burst of symbols using the interference suppression filter with the corresponding plurality of weights for calculating an estimation error for each timing hypothesis by comparing an estimated set of reference symbols with the known set of known reference symbols to determine the estimation error,
wherein size of the plurality of weights increases linearly with a number of antennas receiving the burst of symbols, and output size of the filtering the burst of symbols remains constant;
selecting one of the plurality of timing hypotheses corresponding to a selection criteria based on the determined estimation error;
equalizing the filtered burst of symbols based upon the selected one of the plurality of tinting hypotheses; and
decoding the filtered burst of symbols based upon the selected one of the plurality of timing hypotheses.

60. The non-transitory machine-readable medium of claim 59, wherein minimizing the cost function excludes performing channel estimation.

61. The non-transitory machine-readable medium of claim 60, wherein the cost function comprises calculating
J=min ($\|W[X]-S\|^2$), where W is the plurality of weights, [X] is a matrix of spatial temporal samples of the burst of symbols, and S is a midamble sequence.

62. The non-transitory machine-readable medium of claim 59, wherein the selection criteria comprises a midamble estimation error.

63. The non-transitory machine-readable medium of claim 59, wherein generating the plurality of timing hypotheses comprises estimating a position of a first midamble symbol in the burst of symbols and selecting the subset of the burst of symbols from symbols centered around the estimated position of the first midamble symbol.

64. The non-transitory machine-readable medium of claim 59, wherein the plurality of weights for each timing hypothesis are calculated by solving for $W_{SAIC} = \tilde{s}_k[X]^T\{[X][X]^T\}^{-1}$,
where $\tilde{s}_k$ is a vector corresponding to an estimate of the subset the burst of symbols, [X] is a matrix of spatial temporal samples of the burst of symbols, and $[X]^T$ is a transpose of [X].

65. The non-transitory machine-readable medium of claim 59, wherein the interference suppression filter comprises a single antenna interference cancellation (SAIC) filter.

66. The non-transitory machine-readable medium of claim 59, wherein the interference suppression filter comprises a dual antenna interference cancellation (DAIC) filter.

67. The non-transitory machine-readable medium of claim 59, wherein the size of the plurality of weights has a dimensionality of υ×M (L+1), where υ is a number of symbol streams, M is a spatial length of the subset of the received burst of symbols, and L is a temporal length of the subset of the received burst of symbols.

68. The non-transitory machine-readable medium of claim 67, wherein the interference suppression filter comprises a maximum likelihood sequence estimator (MLSE).

69. The non-transitory machine-readable medium of claim 59, wherein the output size of the filtering the burst of symbols is υ×(p−υ), where υ is a number of symbol streams and p is a length of the estimated set of reference symbols.

70. The non-transitory machine-readable medium of claim 69, wherein the interference suppression filter comprises a maximum likelihood sequence estimator (MLSE).

71. The non-transitory machine-readable medium of claim 59, wherein the interference suppression is performed in a mobile device in the wireless communication system.

72. The non-transitory machine-readable medium of claim 59, wherein the interference suppression is performed in a base station in the wireless communication system.

73. The non-transitory machine-readable medium of claim 59, wherein the instructions further comprise code for feeding back the output of the equalizing as a reference to obtain optimum burst timing for an additional subset of the burst of symbols.

* * * * *